United States Patent
Spagl

(10) Patent No.: US 10,293,944 B2
(45) Date of Patent: May 21, 2019

(54) COMPONENTS FOR ENHANCEMENT OF A LOW PROFILE CREW ATTENDANT SEAT

(71) Applicant: Rockwell Collins, Inc., Cedar Rapids, IA (US)

(72) Inventor: Markus Spagl, Landshut (DE)

(73) Assignee: Rockwell Collins, Inc., Cedar Rapids, IA (US)

( * ) Notice: Subject to any disclaimer, the term of this patent is extended or adjusted under 35 U.S.C. 154(b) by 84 days.

(21) Appl. No.: 15/702,051

(22) Filed: Sep. 12, 2017

(65) Prior Publication Data
US 2018/0155035 A1 Jun. 7, 2018

Related U.S. Application Data

(60) Provisional application No. 62/431,041, filed on Dec. 7, 2016.

(51) Int. Cl.
B64D 11/06 (2006.01)

(52) U.S. Cl.
CPC .......... *B64D 11/064* (2014.12); *B64D 11/062* (2014.12); *B64D 11/0691* (2014.12); *B64D 11/0698* (2014.12)

(58) Field of Classification Search
CPC . B64D 11/062; B64D 11/064; B64D 11/0691; B64D 11/0698
See application file for complete search history.

(56) References Cited

U.S. PATENT DOCUMENTS

| | | | | | |
|---|---|---|---|---|---|
| 1,132,004 | A | * | 3/1915 | Freise | A47C 9/06 297/14 |
| 1,199,002 | A | * | 9/1916 | Freise | A47C 9/06 297/14 |
| 1,412,367 | A | * | 4/1922 | Noack | A47B 5/04 297/14 |
| 1,761,673 | A | * | 6/1930 | Lauris | A47C 9/06 297/14 |
| 3,093,414 | A | * | 6/1963 | Eames | A47C 1/126 297/14 |
| 3,594,037 | A | * | 7/1971 | Sherman | A47C 1/036 297/14 |

(Continued)

FOREIGN PATENT DOCUMENTS

WO WO-2015/130985 9/2015

*Primary Examiner* — James M Ference
(74) *Attorney, Agent, or Firm* — Clements Bernard Walker PLLC

(57) ABSTRACT

A crew attendant seat (CAS) positioned within a wall of an aircraft cabin includes a frame defining a periphery of the CAS. A seat portion is positioned within the frame that includes a seat bottom connected to a seatback by a hinge mechanism in which the seat bottom rotates between stowed and deployed positions. A spring member is mounted at one end to the frame and at another end to an aperture on the hinge mechanism, which causes the seat bottom to move to the stowed or deployed position based on relative positioning between the aperture and pivot points for the spring member and hinge mechanism. A harness includes at least one shoulder strap and lap belt coupled together by a buckle. A storage area retains the lap belt and the buckle within the frame when the seat bottom is in the stowed position.

20 Claims, 18 Drawing Sheets

(56) References Cited

U.S. PATENT DOCUMENTS

| | | | |
|---|---|---|---|
| 4,460,215 A * | 7/1984 | Chamberlain | A47C 9/06 297/14 |
| 4,580,832 A * | 4/1986 | Maruyama | A47C 9/06 297/14 |
| 4,679,749 A * | 7/1987 | Ryan | B64D 11/06 244/122 R |
| 4,779,926 A * | 10/1988 | Maruyama | B60N 2/32 297/14 |
| 4,832,404 A * | 5/1989 | Baymak | B64D 11/0691 280/808 |
| 4,902,069 A * | 2/1990 | Lehnert | B64D 11/0691 297/14 |
| 4,913,487 A * | 4/1990 | Breckel | A47C 9/06 297/14 |
| 4,993,666 A * | 2/1991 | Baymak | B09B 1/00 244/122 R |
| 5,564,780 A * | 10/1996 | Presser | B60N 2/2878 297/238 |
| 5,918,937 A * | 7/1999 | Moffa | B60N 2/3047 297/324 |
| 6,089,651 A * | 7/2000 | Carmen | A47C 1/126 248/501 |
| 6,742,743 B2 * | 6/2004 | Saint-Jalmes | A47C 7/024 244/122 R |
| 6,896,322 B1 * | 5/2005 | Foy | A47C 1/126 297/129 |
| 7,490,906 B2 * | 2/2009 | Schumacher | A47C 1/023 296/65.01 |
| 8,113,137 B2 * | 2/2012 | Thompson | B63B 29/04 114/363 |
| 8,449,012 B2 * | 5/2013 | Seibold | B60N 2/856 296/65.05 |
| 8,820,862 B1 * | 9/2014 | Erickson | B64D 11/0691 312/257.1 |
| 9,187,179 B1 * | 11/2015 | Pacheco | B64D 11/0691 |
| 9,192,530 B2 * | 11/2015 | Stent | A47C 1/022 |
| 2006/0202085 A1 * | 9/2006 | Schotte | B64D 11/0023 244/119 |
| 2007/0114819 A1 * | 5/2007 | Dougherty | A47C 9/06 297/14 |
| 2012/0199695 A1 * | 8/2012 | Isherwood | B64D 11/0691 244/118.6 |
| 2013/0126672 A1 * | 5/2013 | Weitzel | B64D 11/06 244/118.6 |
| 2013/0206906 A1 * | 8/2013 | Burrows | B64D 11/02 244/118.5 |
| 2013/0313365 A1 * | 11/2013 | Ehlers | B64D 11/06 244/118.6 |
| 2013/0334369 A1 * | 12/2013 | Schliwa | B64D 11/02 244/118.5 |
| 2014/0027572 A1 * | 1/2014 | Ehlers | B64D 11/06 244/118.6 |
| 2014/0048650 A1 * | 2/2014 | Schliwa | B64D 11/00 244/118.5 |
| 2014/0166808 A1 * | 6/2014 | Boenning | B64D 11/06 244/118.6 |
| 2014/0209741 A1 * | 7/2014 | Boenning | B64D 11/06 244/118.6 |
| 2014/0224930 A1 * | 8/2014 | Ivester | B64D 11/04 244/118.5 |
| 2014/0224931 A1 * | 8/2014 | Weitzel | B64D 11/06 244/118.6 |
| 2014/0252830 A1 * | 9/2014 | Johnson | B64D 11/06 297/337 |
| 2014/0319275 A1 * | 10/2014 | Najd | B64D 11/02 244/118.6 |
| 2014/0368012 A1 * | 12/2014 | Burd | B64D 11/06 297/337 |
| 2014/0375086 A1 * | 12/2014 | Schliwa | B64D 11/0691 297/14 |
| 2015/0251762 A1 * | 9/2015 | Ehlers | B64D 11/06 244/118.3 |
| 2015/0375644 A1 * | 12/2015 | Gratz | B60N 2/309 297/316 |
| 2016/0122021 A1 * | 5/2016 | Savian | B64D 11/02 244/118.5 |
| 2018/0155035 A1 * | 6/2018 | Spagl | B64D 11/064 |

* cited by examiner

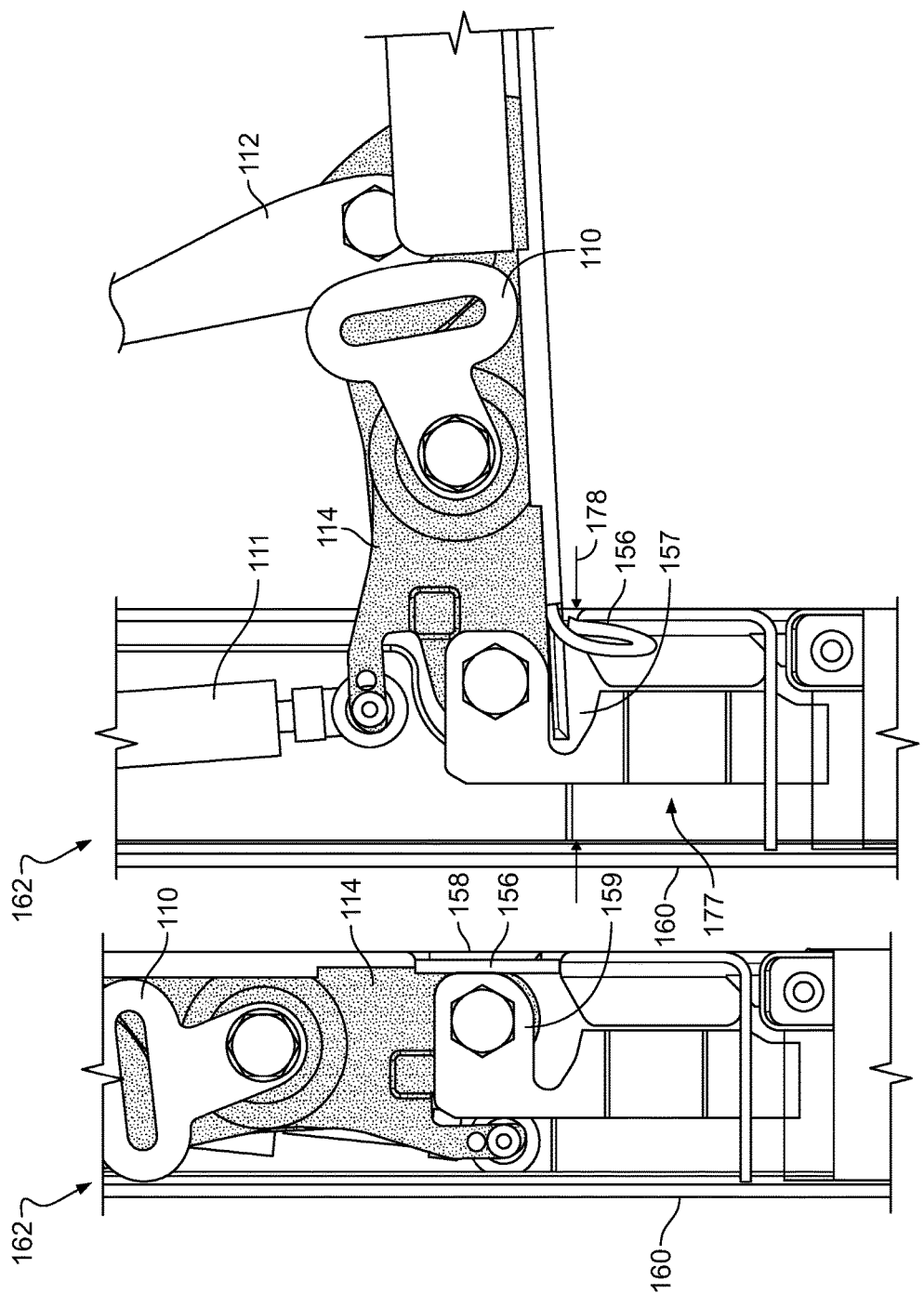

COMPONENTS FOR ENHANCEMENT OF A LOW PROFILE CREW ATTENDANT SEAT

CROSS-REFERENCE TO RELATED APPLICATIONS

This application claims priority to U.S. Provisional Patent Application Ser. No. 62/431,041, entitled "Components for Enhancement of a Low Profile Crew Attendant Seat," filed Dec. 7, 2016.

This application incorporates by reference, in their entirety, the following prior patent applications by B/E Aerospace, Inc. directed to cabin attendant seats: U.S. Patent Application Publication No. 2014/0368012, entitled "Compact Aircraft Cabin Attendant Seat," filed Jun. 11, 2014, and U.S. Patent Application Publication No. 2014/0252830, entitled "Stowable Aircraft Cabin Attendant Seat," filed Mar. 5, 2014. All above identified applications are hereby incorporated by reference in their entireties.

BACKGROUND

Aircraft crew attendant seats, or jump seats, are commonly provided in cockpits or passenger cabins. Passenger cabin attendant seats are typically used by the passenger cabin flight attendant crew, especially during takeoff and landing, and are typically located near an emergency exit to allow a flight attendant to readily open an exit door if necessary in the event of an emergency. Such passenger cabin crew attendant seats also are commonly designed to be folded when not in use to maintain clear pathways to emergency exits.

One conventional flight attendant's folding seat assembly for mounting to a wall in an aircraft cabin includes a seat bottom that can be unfolded and pulled down to an open position against a seat return spring, with cams that are actuated by the seat bottom frame that urge the seat back into a downwardly and forwardly sloping seating orientation, and rearward force exerted by a user against the seat back frame is reacted through the cams into the supporting wall, so that the seat bottom is not forced to close on the seated occupant. The seat bottom frame is provided with a contoured seat cushion that complements contouring of a seat back cushion.

Another conventional seat or chair for an aircraft flight attendant includes a seatback section and a seat section hinged to each other and to a frame allowing the seatback and seat sections to take up different angular positions.

A crashworthy rear-facing aircraft passenger seat is known that includes forward, intermediate and rearward energy absorbers attached between the seat and the floor of the aircraft, and has the capability of operating in both tension and compression for absorbing energy during a crash. The seat also can flex along with crash-induced distortions of the floor to prevent separation of the seat from the floor during a crash.

In today's commercial airline industry, airline companies prefer passenger cabin arrangements that maximize the number of seats available for passengers. Unfortunately, increasing the number of seats in an aircraft can reduce the amount of space available for lavatories, food service galleys, and crew attendant seats. Moreover, government agencies such as the Federal Aviation Administration (FAA) and the European Aviation Safety Agency (EASA) have promulgated regulations which mandate minimum widths of passageways leading to an emergency exit. For example, U.S. regulation 14 C.F.R. § 25.813 provides that the passageways such as aisle 151 in FIG. 1A which lead to main exit doors must provide an unobstructed passageway at least 36 inches wide. EASA regulations may be found at JAR/CS25.815.

Accordingly, there is a need for a high passenger solution ("HPS") for single and dual-aisle passenger aircraft which provides space for at least one additional row of passenger seats and provides a sufficient solution for crew attendant seats while meeting the FAA regulations related to passageway clearance.

SUMMARY OF ILLUSTRATIVE EMBODIMENTS

The forgoing general description of the illustrative implementations and the following detailed description thereof are merely exemplary aspects of the teachings of this disclosure, and are not restrictive.

In certain embodiments, a crew attendant seat (CAS) positioned within a wall of an aircraft cabin may include a frame that defines a periphery of the CAS within the wall. A seat portion may be positioned within the frame that includes a seat bottom connected to a seat back by a hinge mechanism in which the seat bottom rotates between a stowed and a deployed position. A spring member may be mounted at one end to an inner surface of the frame and at another end to an adjustable aperture on the hinge mechanism. The spring member may cause the seat bottom to automatically move to the stowed position or the deployed position based on a relative positioning between the adjustable aperture and respective pivot points for the spring member and hinge mechanism. A harness for restraining a seated passenger is mounted to the seat portion, which may include at least one of a shoulder strap and lap belt coupled together by a buckle at one end of a lap belt. A storage area may retain the lap belt and the buckle within the frame when the seat bottom is in the stowed position.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 8A-8B illustrate side views of a storage area for a CAS;

DETAILED DESCRIPTION OF ILLUSTRATIVE EMBODIMENTS

Figure 1A:
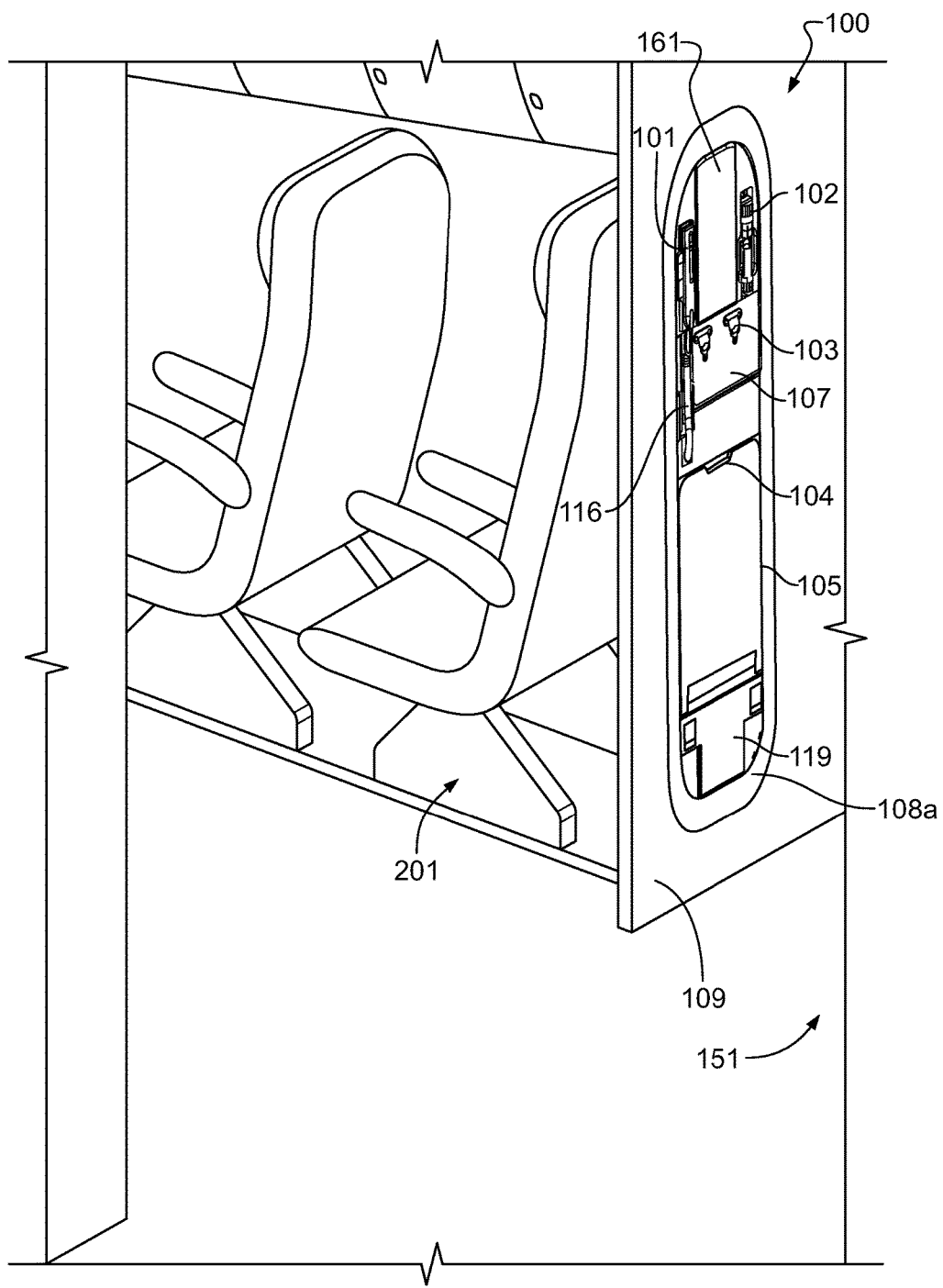
FIG. 1A illustrates a perspective view of a crew attendant seat (CAS) in an upright or stowed position.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Turning to the figures, FIG. 1A depicts a crew attendant seat (CAS) 100 in an upright or stowed position. In some implementations, passageway 151 within an aircraft cabin may lead to a full-sized aircraft door that allows passengers to embark and disembark the plane through passageway 151 during normal aircraft service. In some examples, the CAS 100 may be mounted within a wall 109 and may have a minimal lateral profile that extends into the passageway no more than 1-4 inches, in preferred embodiments no more than about 3 inches, in more preferred embodiments no more than 2.5 inches and in most preferred embodiments no more than about 2 inches, 1.5 inches, 1 inch or 0.5 inch.

In some implementations, the CAS 100 may be mounted on or embedded or disposed within any wall, vertical partition, or door structure within an aircraft cabin. Whereas FIG. 1A depicts the CAS 100 as being embedded within an aperture wall 109, the CAS 100 may alternatively be surface-mounted on or embedded within a class divider partition, a wall in a galley area, or a lavatory door. In the latter implementation, the lavatory door may be preferably a single-panel door and not a dual panel or bi-fold door. In some examples, the CAS 100 may also be mounted laterally such that the seated crew member, also referred to as a passenger, faces toward a side wall or fuselage of the aircraft cabin in a direction perpendicular to a longitudinal or long axis of the aircraft. The CAS 100 may also be implemented in non-fixed wing aircraft such as helicopters, vertical take-off and landing (VTOL) craft, and other aircraft without fixed wings.

Several aspects of the CAS 100 may help minimize its lateral width and thus reduce a distance that the CAS 100 extends into passageway 151. First, improved hinge mechanisms may provide appropriate articulation within a reduced lateral profile. Second, a novel locking mechanism may be provided to enable maintenance crew to readily switch the CAS 100 between a first operational mode in which the CAS 100 automatically raises to a stowed position and a second operational mode wherein the crew member causes articulation of the CAS 100 to the stowed position by urging the seat bottom upwardly. Third, the CAS 100 may include a compact storage area 162 (FIG. 2A) for a buckle 153 (FIG. 1B) and lap belts 155 (FIG. 2A) at a rear portion of seat bottom 105 (when in the deployed position) such that the buckles 153 tend to naturally fall into the storage area 162 when the seat bottom 105 is raised to the stowed position. Fourth, accessory components associated with the CAS 100 may be recessed within the CAS assembly 100. Fifth, the shoulder belt inertial reel and retractor assembly 180 (FIGS. 9A-9D) may also be recessed into the CAS structure. To enable maintenance of the inertial reel and retractor assembly 180, an access panel 107 may be designed to be readily removable without the use of any additional tools (tool-less access) such that an optional, unitary inertial reel assembly 180 may be quickly removed and replaced. Sixth, the seat bottom may be designed to be lowered into a deployed or seated position without the use of a handle which extends into the passageway 151. Each of these aspects is discussed in detail further below.

In FIG. 1A, the CAS 100 is shown in an upright or stowed position in which seat bottom 105 is biased into the depicted position such that an upper surface of the seat bottom 105 abuts a seatback assembly 106 of the CAS 100, and a lower surface of the seat bottom 105 may be substantially flush with a frame 108 of the CAS 100 when in the stowed position. Throughout the disclosure, references to the seat bottom 105 can refer to the seat bottom frame or a seat bottom assembly as a whole, which may include the seat bottom frame and any associated covers or cushions that cover the seat bottom frame.

In some implementations, accessory components such as a flashlight 102, phone/intercom handset 101, handset cord 116, shoulder belts 103 and lap belts 155, shoulder belt inertial reels, and buckle 153 may be stowed within the CAS 100 when in a stowed position such that the accessory components do not extend into the passageway 151 any substantial distance further than, for instance, the seat bottom 105. In some examples, tensioners for shoulder belts 103 are configured such that a portion of the shoulder belts 103 are not fully retracted onto the inertial reels. Rather, the unretracted portion of the shoulder belts 103 may cause the buckles of the shoulder belts 103 to lay flat against panel 107 by operation of gravity. In some examples, the shoulder belts 103 and access panel 107 may be positioned above a seatback 106 on the CAS 100.

In some implementations, an edge of the seat bottom 105 may be include a handle recess 104 to enable the crew members to pull the seat bottom 105 from the stowed position into a seated position without the use of a handle that extends into passageway 151. For example, the handle recess 104 may be a groove or cut-out in an edge of the seat bottom that is sized to receive one or more fingers of the crew member moving the seat bottom 105 between the stowed and deployed positions. For example, the handle recess 104 may be disposed on a front edge of the seat bottom 105 when the seat bottom 105 is in the deployed position, which may also correspond to an upper edge of the seat bottom 105 in the stowed position. In some examples, the handset cord 116 may be received within a vertical recess such that the handset cord 116 does not extend into the passageway 151.

In one example, crew life vests may be stored in an enclosure or compartment covered by an access door 119 positioned below the seat bottom 105. The CAS 100 can also contain other components (e.g., oxygen mask, control panels) that do not extend from the frame 108 greater than a distance that the seat bottom 105 extends from the frame 108 when in the stowed position. Alternatively or in addition to storing life vests, the enclosure behind the access door 119 may be used to store personal items. In some examples, the crew life vests may be stored within a storage compartment behind head rest cushion 161, which in such an embodiment may be readily removable by a crew member pulling the cushion 161 away from the frame 108. In some implementations, the frame 108 includes flanges 108a/108b that surround a periphery of the frame 108 for the CAS 100.

Figure 1B:
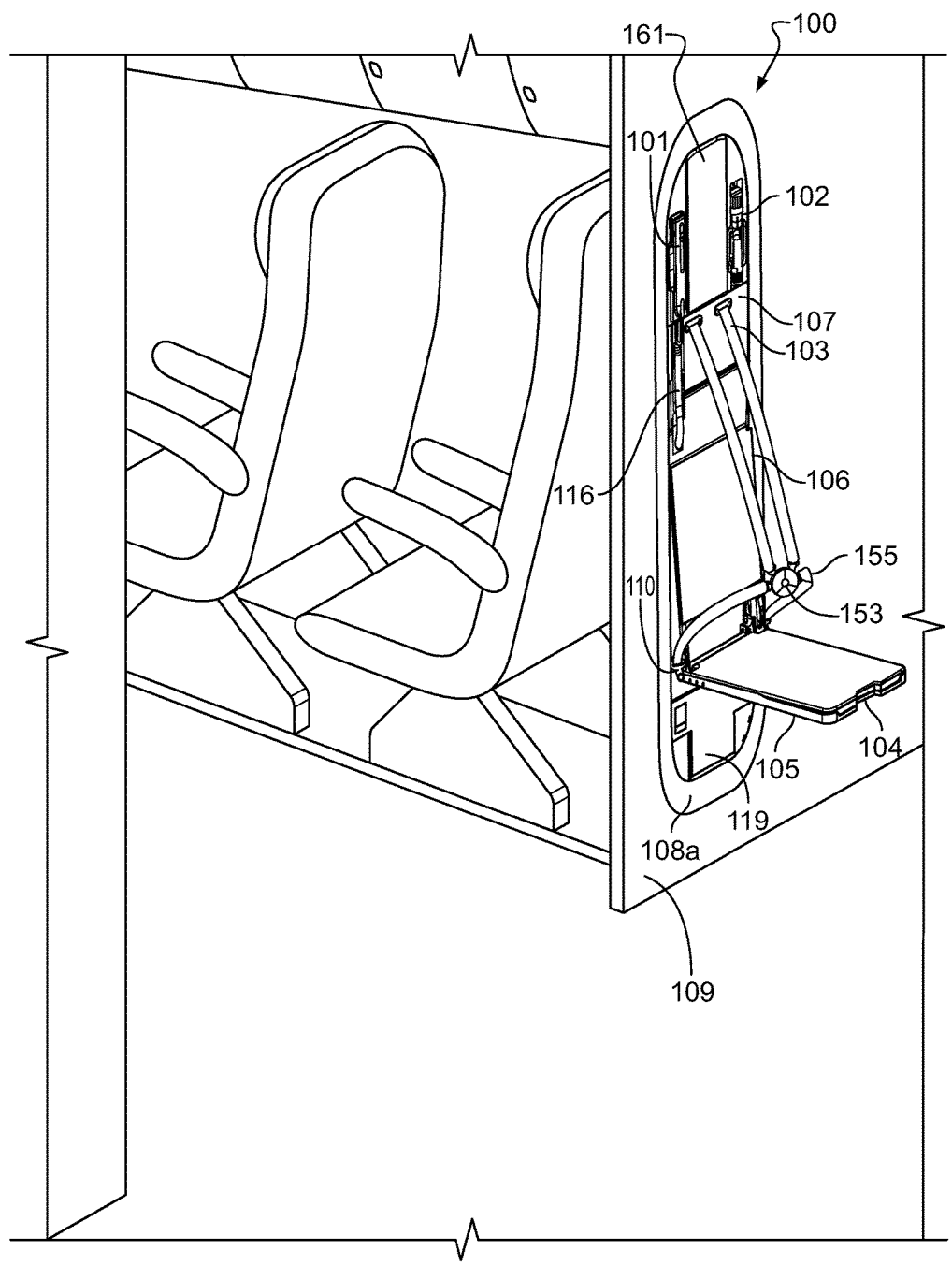
FIG. 1B illustrates a perspective view of the CAS in a deployed or seated position.

FIG. 1B shows the CAS 100 in a deployed or seated position, as would occur when a flight crew member is seated in the CAS 100 during taxi, take-off and landing (TTOL) as well when the aircraft experiences turbulent conditions. In the deployed position, the seat bottom 105 may be rotated downward from the stowed position such that the seat bottom is disposed substantially perpendicular to the seatback 106. In some implementations, the shoulder belts 103 may be attached to a buckle 153 and lap belts 155 may be likewise connected to the buckle 153 such that the buckles for the shoulder belts 103 and lap belts 155 can be coupled together at buckle 153 to form a restraining device or harness for a crew member seated in the CAS 100. In some examples, the recessed installation of accessory components, such as phone/intercom handset 101, cord 116 and flashlight 102 may provide crew comfort and reduce a risk that dislodging of the components will cause injury to a crew member's head during a crash or turbulence event. Further, recessed installation of accessory components can avoid injury or entrapment by the crew member, for example due to becoming tangled in the cord 116.

Figure 1C:
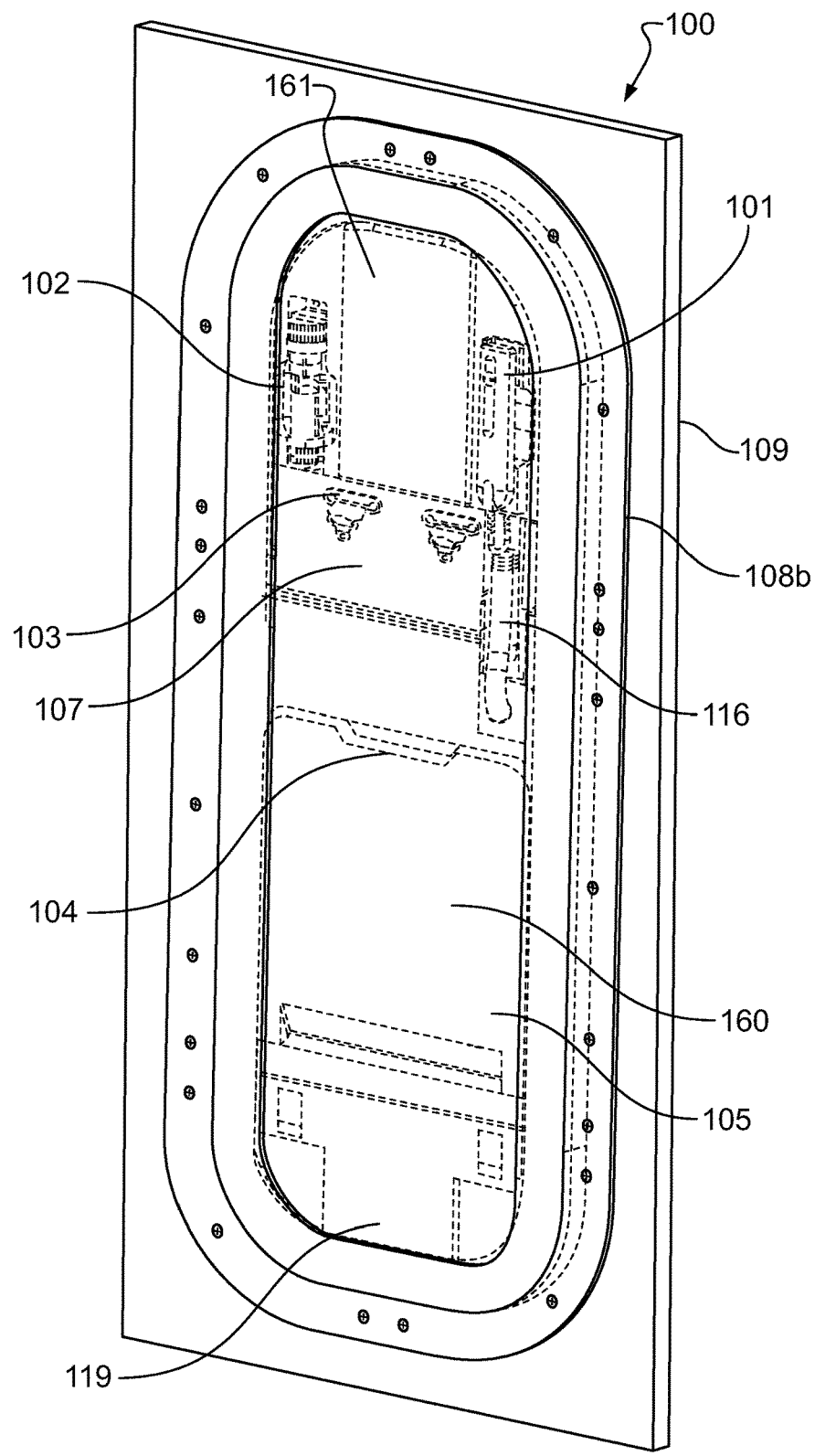
FIG. 1C illustrates a perspective view of a forward-facing side of the CAS.

FIG. 1C illustrates a forward-facing side of the CAS 100 which is hidden from view in FIGS. 1A and 1B. The side shown in FIG. 1C is the forward side in the sense that it faces a forward end of the aircraft, but it can be understood that the forward-facing side of the CAS 100 shown in FIG. 1C could also be oriented toward a rear end or a side of the aircraft. In some implementations, a forward surface 160 may be substantially flat in a vertical plane and may extend into the passenger cabin no more than 1-4 inches, in preferred embodiments no more than about 3 inches, in more preferred embodiments no more than 2.5 inches and in most preferred embodiments no more than about 2 inches, 1.5 inches, 1 inch, or 0.5 inch. A flange 108b disposed around a periphery of the CAS 100 may have a width of about 2-4 inches, in other embodiments about 1-5 inches, and in still other embodiments, 3-6 inches. In some examples, the flange 108b may receive fasteners which cooperate with complementary fasteners and a complementary flange 108a on the rear side of the CAS 100 (e.g., opposite side from that shown in FIG. 1C, such as the side facing the passageway 151, as illustrated in FIG. 1B).

In some implementations, a wall portion between flanges 108a, 108b may be reinforced with enhanced rigidity structural members such that wall 109 can withstand a 16G load applied to the CAS 100. Government agencies such as the FAA and the EASA have promulgated regulations which mandate emergency load capacities for aircraft seats. For example, by FAA regulation, certain seats must be configured to withstand a 14G structural plus lumbar load seat test set forth in 14 C.F.R. 25.562. Similarly, the EASA regulations may be found at CS 25.562. In some examples, the wall 109 may include vertical and horizontal beams into which the flanges 108a, 108b are fastened. The vertical beams may be mounted to the cabin floor and cabin ceiling or other aircraft structural component proximate the ceiling. These vertical beams may not ordinarily be contained within the wall 109, which may have a honeycomb laminate construction as described in WO 2015/130985, entitled "Composite Sandwich Panel Having Curable Composite Skins with Asymmetrical Resin Distributions," filed 26 Feb. 2015, the entirety of which is incorporated by reference. Without such beams or reinforced regions in wall 109, the wall 109 may deflect forwardly into a passenger seat 201 (illustrated in FIG. 1A) during a crash or turbulence event. Moreover, without such beams or reinforced regions, the wall 109 may distort or bend sufficiently during a crash or turbulence event to permit the CAS 100 to become dislodged from the wall 109, which would may be operationally unacceptable.

In some implementations, inclusion of such beams or reinforced regions may provide strength sufficient to permit the CAS 100 and wall 109 to receive loads from the passenger seat 201 (shown in FIG. 1A) adjacent to the wall 109, which in turn may permit the surface 160 to be positioned within one inch of the seat back of seat 201. Governmental regulations also dictate certain standards for static load handling, load sharing and dynamic load handling. For example, FAA regulation 14 CFR 25.562 (incorporated herein by reference) provides that seats and restraint systems must be able to withstand a 16G dynamic load. EUSA regulation CS 25.562 dictates similar requirements for European aircraft. U.S. regulation 14 CFR 25.561 (corresponding to EUSA CS 25.561, each incorporated herein by reference) provides that other aircraft structures such as bulkheads must be able to withstand a 9G forward static load. It is understood in the industry that if structures are spaced within one inch of one another, it must be demonstrated that the structures are capable of sharing loads during normal use and emergency landing conditions. Due to the complexity of the analysis, those skilled in the art of aircraft interior components generally avoid placing components within one inch of one another. For this reason, a minimum spacing of one inch has generally been maintained between bulkheads and seating systems (e.g. between a bulkhead and the aft surface of an aircraft seat).

Figure 1D:
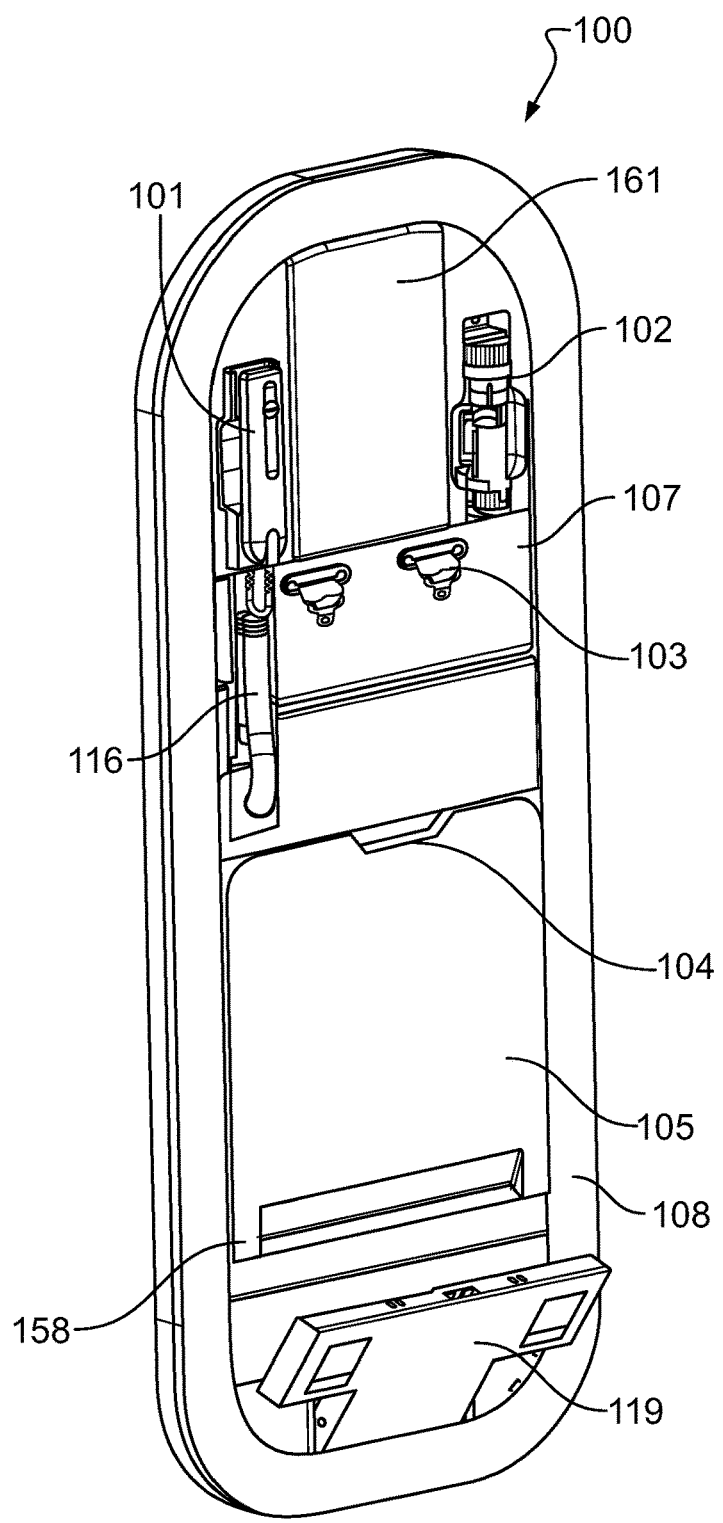
FIG. 1D illustrates a perspective view of a rear-facing side of the CAS in an upright or stowed position.

FIG. 1D shows the rear face of the CAS 100 (the side facing the rear of the plane and passageway 151). Access door 119 is shown in at least a partially open position, revealing a storage compartment for the crew member life vest or other auxiliary supplies. In some implementations, the access door 119 may be hingedly connected to a lower end of the frame 108 such that the access door 119 rotates in a downward and outward direction when moving to an open position to provide access to the contents of the storage compartment. When the access door 119 is in the closed position, an outer surface of the access door 119 may be substantially flush with the frame 108 of the CAS 100. The shoulder straps 103 are shown in FIG. 1D in the fully retracted position, in which a portion of the shoulder straps 103 remain unretracted in order to provide sufficient slack for the buckles disposed at the ends of the shoulder straps 103 to lay substantially flat against the panel 107. In some implementations, head rest 161 may include a cushion to soften the impact of the crew member's head against the head rest 161 during a crash or turbulence event. In some examples, the seat bottom 105 includes downwardly/rearwardly extension members 158 at lateral edges of the seat bottom 105 which cover a hinge mechanism so as to prevent injury or introduction of physical obstructions into the hinge area. For example, when the seat bottom 105 is in the deployed position, the extension members 158 may extend in a rearward direction. When the seat bottom 105 is in the stowed position, the extension members may extend in a downward direction from the seat bottom.

Figure 2A:
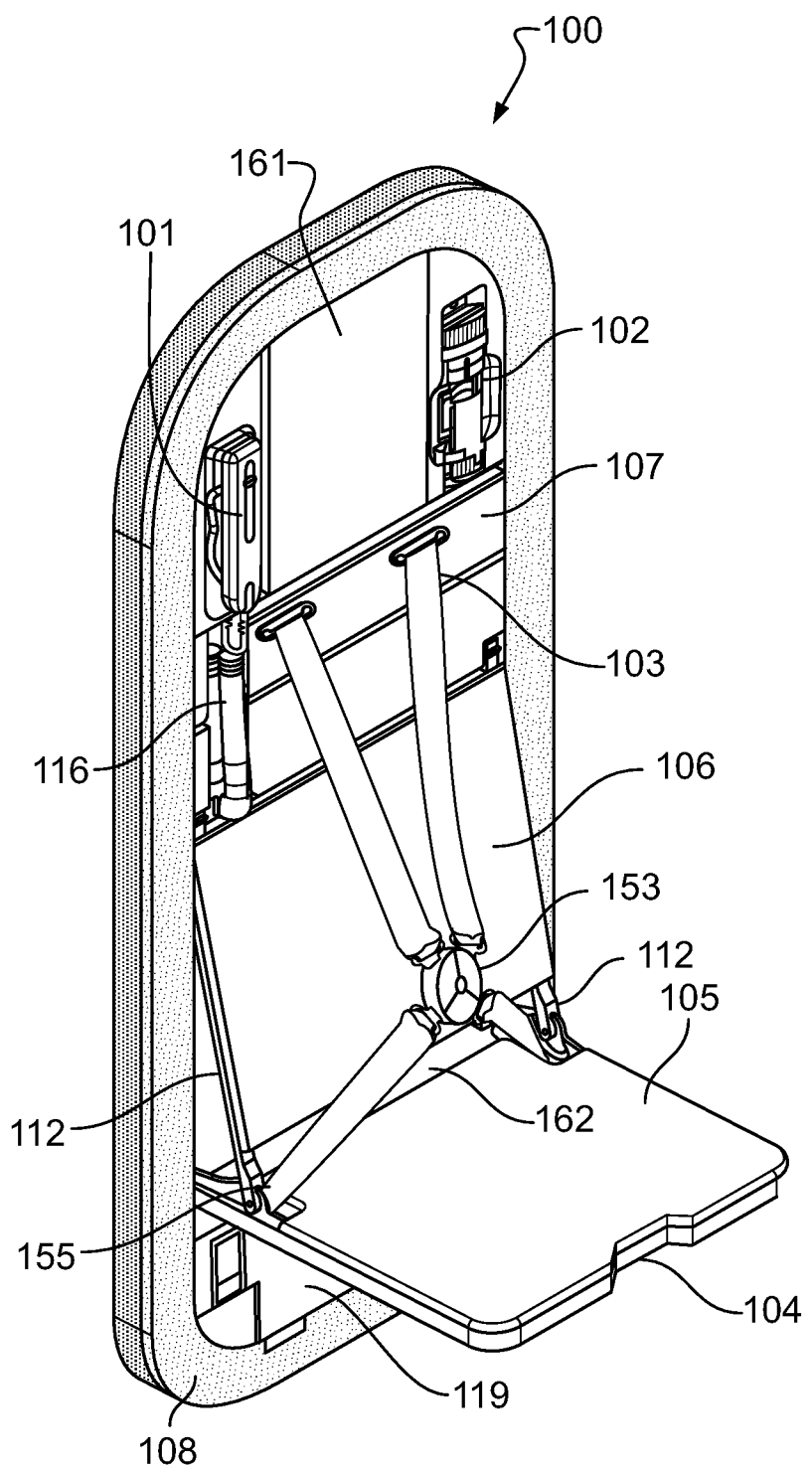
FIGS. 2A-2B illustrate close-up perspective views of the CAS in a deployed or seated position.

FIG. 2A provides a close-up view of the CAS 100 in a deployed or seated position in which an upper surface of the seat bottom 105 may be substantially perpendicular to an outer surface of the seatback 106. In some implementations, the CAS 100 includes a storage area 162 that receives lap belt strap 155 and buckle 153. For example, when buckle 153 is released from a buckled state, the shoulder straps 103 may retract to the position shown in FIG. 1D and one of the two lap straps 155 is released from the buckle 153. The other lap belt strap 155 remains permanently attached to the buckle 153. After the crew member stands up, the buckle 153 and both lap belt straps 155 may be sitting, or will be placed by the crew member, on seat bottom 105 or directly into storage area 162. In certain embodiments, the buckle 153 and both lap belt straps 155 may, as the seat bottom 105 is raised form the deployed to the stowed position, naturally slide into the storage area 162 without further intervention from the crew member. This provides the substantial advantage that the crew member need not take the time to adjust or place the lap belt straps 155 or buckle 153 before the seat bottom 105 assumes its fully upright or stowed position, which in turn provides the widest passageway 151. In a most preferred embodiment, the crew members may simply place the buckle 153 and both lap belt straps 155 on the seat bottom 105 and may then exert an upward force on the front edge of the seat bottom 105 ("front" meaning in this context closest to the crew member, although in the depicted plan configuration this is toward the rear of the aircraft) in an upward direction toward the stowed position. Once the manually applied rotational force by the crew member overcomes a locking action of a gas spring and damper mechanism (discussed below) the seat bottom 105 may automatically swing to an upright (stowed) position and the buckle 153 and lap belt straps 155 may fall into the storage area 162. Additionally, cord 116 may be received within the depicted recess such that the cord 116 does not extend beyond the frame 108.

Figure 2B:
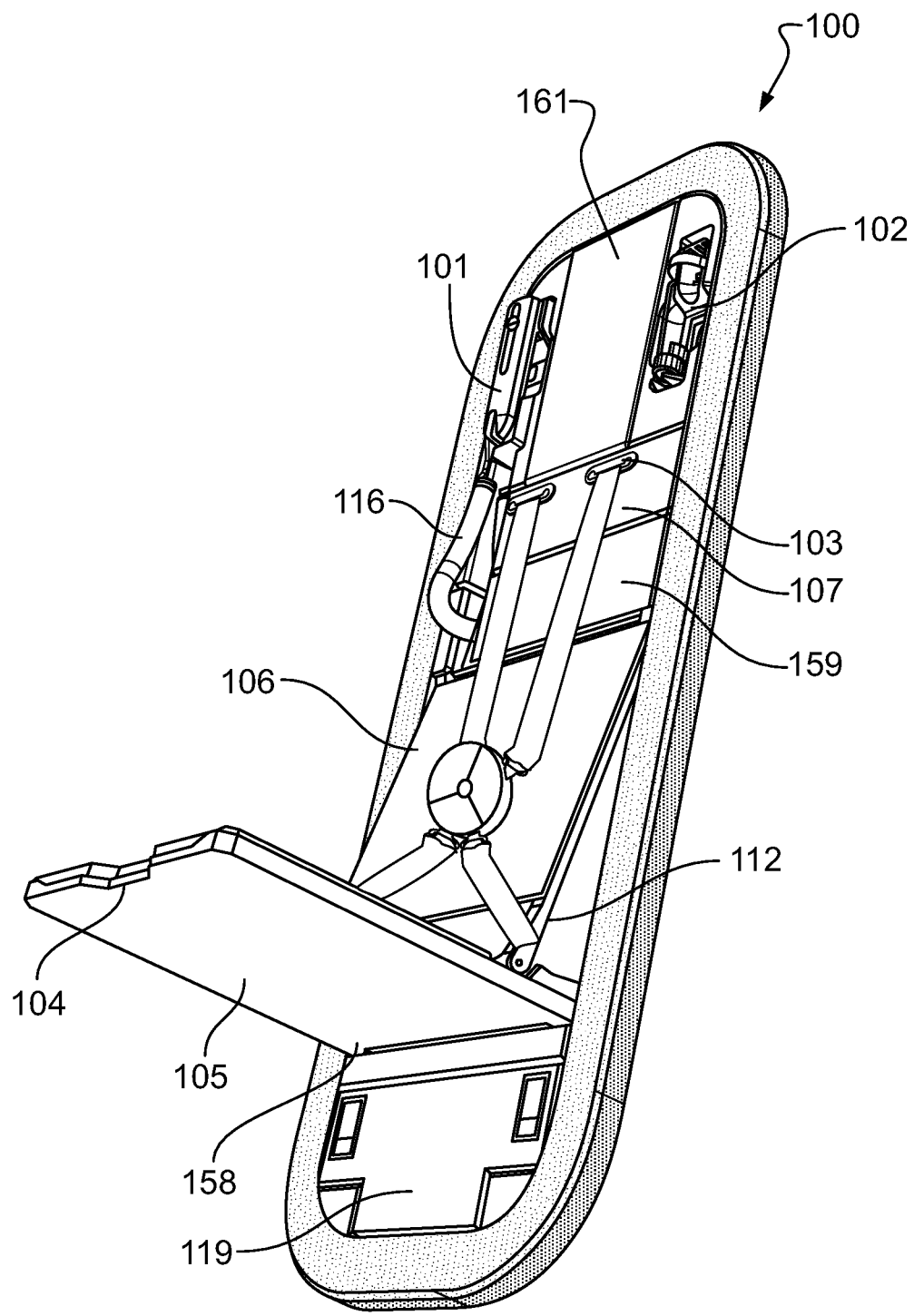

In the close-up perspective view of the CAS 100 in the deployed position shown in FIG. 2B, extension members 158 at the lateral edges of the seat bottom 105 have pivoted back into the hinge area, internal to the CAS 100. The aspect of the hinge design which accommodates the extension members 158 will be discussed in further detail below. In some implementations, the central positioning of handle recess 104 on an edge of the seat bottom 105 facing away from the seatback 106 permits the seat bottom 105 to have maximum length (fore to aft) in the areas which support the crew member's legs, which in turn enhances comfort. Additionally, this configuration omits a separate handle mechanism which extends into the passageway 151, thus providing improved clearance for passengers and crew members traversing the passageway 151.

Figure 3A:
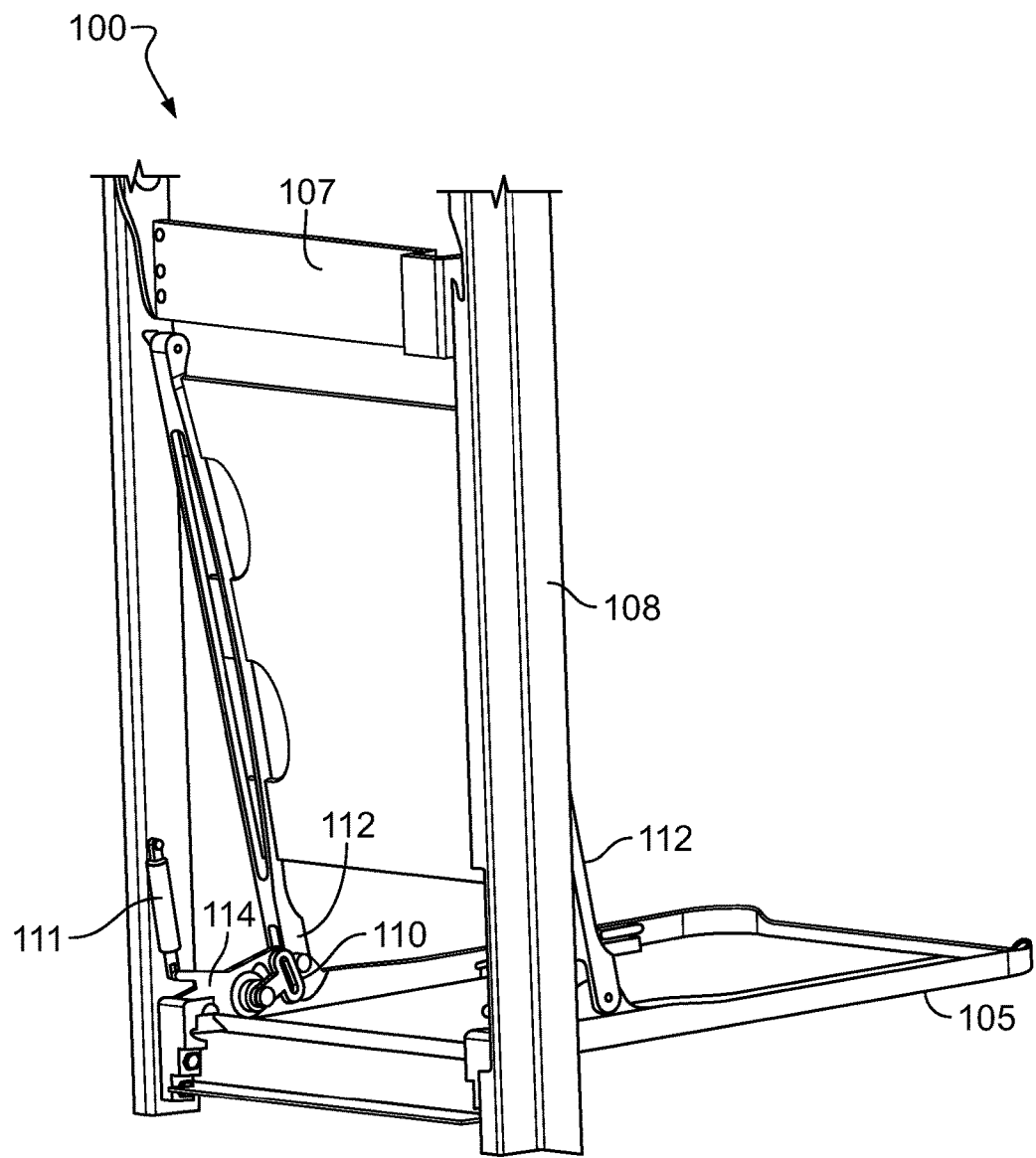
FIGS. 3A-3C illustrate a mechanism for biasing a seat bottom of the CAS into stowed and deployed positions
Figure 3C:
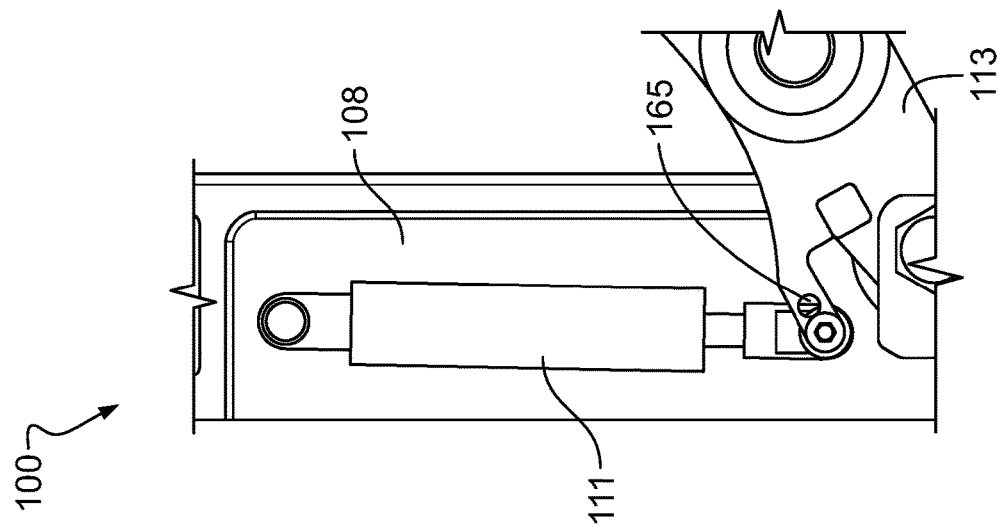
Figure 3B:
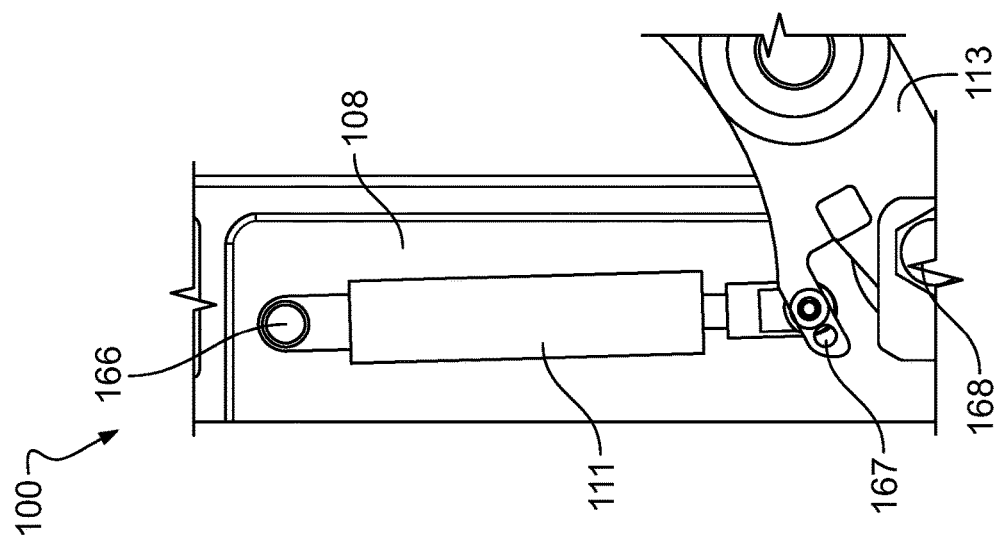

Turning to FIGS. 3A to 3C, a hinge mechanism which biases the seat bottom into the stowed and deployed positions is illustrated. In some implementations, a piston 111 may disposed along an inner surface of frame 108 of the CAS 100 and may preferably include a gas spring, coil spring, and/or damper mechanism which provide a downward force on hinge mechanisms 113/114 positioned on each side of the CAS 100 while restricting the maximum rate of travel of hinge mechanisms 113/114. In some implementations, a first end of the piston 111 may be pivotably connected to an inner surface of the frame at pivot point 166, and a second end of the piston 111 may be pivotably connected to the hinge mechanisms 113/114 at an adjustable aperture 165 or 167 based whether the seat bottom 105 is biased in the stowed position or the deployed position. The hinge mechanisms 113/114 may couple the second end of the piston 111 to a seatback frame 112 for the seatback assembly 106 and the seat bottom 105 at a coupling element 110. In some examples, the coupling element 110 of the hinge mechanisms 113/114 may cause the seatback frame 112 and the seat bottom 105 to cooperatively hinge between the stowed and deployed positions. For example, the cooperative hinging operation at the coupling element 110 may cause the seatback frame 112 to partially recline the seatback assembly 106 as the seat bottom 105 is moved to the deployed position from the stowed position.

FIGS. 3B and 3C show the piston 111 connected to the hinge mechanisms 113/114 in a first and second operative position associated with adjustable apertures 165 and 167, respectively. In the first operative position (FIG. 3B), the seat bottom 105 may be biased to remain in a particular position until a predetermined amount of force is applied to the seat bottom 105 to move the seat bottom 105 to an opposite position. In some aspects, the seat bottom 105 may be biased to return to the position (stowed or deployed) in which the seat bottom 105 was previously placed until the seat bottom 105 is moved to the opposite position. For example, at the first operative position, the second end of the piston 111 may be mounted to a first aperture 165, which moves past (e.g., to the right of as shown in FIGS. 3B and 3C) the hinge pivot point 168 as the CAS 100 as the seat bottom 105 approaches the fully deployed position. This movement of the first aperture 165 past the hinge pivot point 168 causes the piston 111 to force the seat upwards (into the stowed position) until the seat bottom 105 is brought almost entirely to the deployed position, at which time the first aperture 165 lies along an imaginary line connecting pivot point 166 on the frame 108 and hinge pivot point 168, which may also be referred to as a neutral position.

Similarly, as the seat bottom 105 is moved to the fully stowed position from the fully deployed position, the hinge pivot point 168 moves past (e.g., to the right of as shown in FIGS. 3B and 3C) the aforementioned imaginary line or neutral position, and the piston 111 forces the seat down into a fully deployed position. In preferred embodiments, the spring force of the piston 111 at the first operative position may be sufficient to hold the seat bottom 105 in the deployed position until the crew member applies a force of 0.5 to 10, 1 to 9, 2 to 8, 3 to 7 or 4 to 5 pounds in the upward direction to maintain the seat bottom 105 in the stowed position. After application of such a force, the pivot point 168 is moved to the left of the imaginary line as shown in FIG. 3B and the piston 111 may preferably apply sufficient spring and damping forces to return the seat to an upright position in about 1 to 5 seconds, 2 to 4 seconds or about 2 to 3 seconds. The retarding of this upward motion to the stowed position may permit the buckle 153 and lap belt straps 155 sufficient time to slide or settle into storage area 162 automatically and prevent pinching of crew members' hands or fingers between the seat bottom 105 and a shoulder-level panel 159 (illustrated in FIG. 2B). The shoulder-level panels 107,159 may optionally include cushions to provide comfort to a crew member seated in the CAS 100.

FIG. 3C shows an alternative configuration into which maintenance crew can readily place the CAS 100. In this second operative condition the lower end of piston 111 is mounted within aperture or pivot point 167, which does not cross the "neutral position" discussed above. In this configuration, piston 111 may constantly exert a biasing force which tends to lift the seat bottom 105 into the stowed position. For example, the seat bottom 105 may start lifting from the deployed position to the stowed position as soon as a crew member stands up and is no longer in contact with the seat bottom 105. In other embodiments, the second operative position may cross the neutral position but by a lesser amount than the first operative position (FIG. 3B), thus decreasing the biasing force which tends to hold the seat bottom 105 in the deployed position. In still other embodiments, the hinge 113/114 may be provided with three, four, or five apertures allow a predetermined amount of force applied by the piston 111 to bias the seat bottom 105 into a stowed position and/or a deployed or seated position to be adjusted.

Figure 11A:
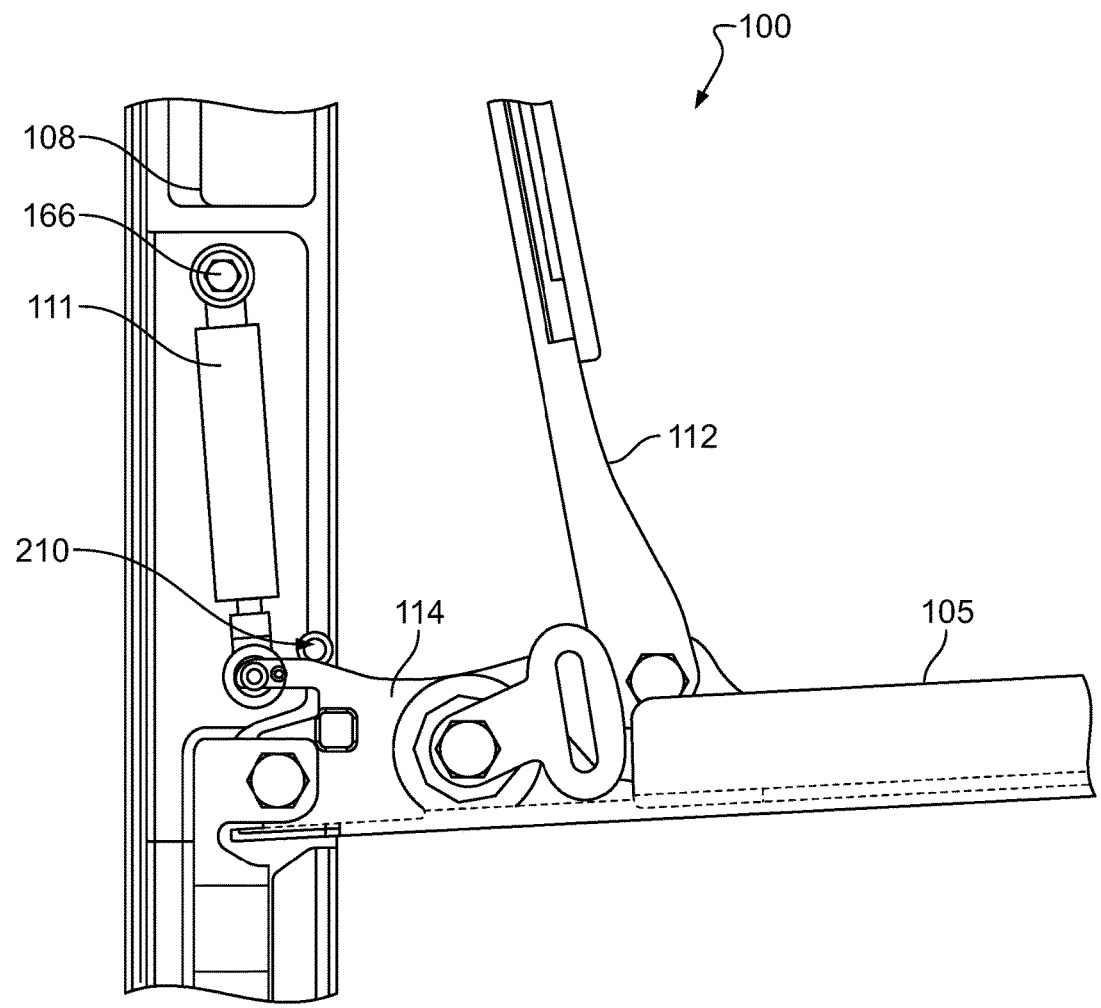
FIGS. 11A-11B illustrate side views of a portion of a CAS showing a mechanism for retaining the CAS in a deployed position.

FIG. 11A illustrates an alternative implementation for a biasing mechanism to retain the seat bottom 105 in a deployed position. In some implementations, the biasing mechanism may include a spring plunger 210 mounted on one or both sides of the frame 108 that articulates along an axis perpendicular to the plane of the figure. In some implementations, a distal, protruding end of the spring plunger 210 may be rounded to cooperate with complementary smoothed or rounded portions of the seat bottom 105 such that as soon as the seat bottom 105 is folded down into the deployed position, the spring plunger 210 slides outward from the frame 108 to lock the seat bottom 105 in place by blocking upward movement of the hinge mechanisms 113/114. When folding the seat bottom upward toward the stowed position, the force of the spring plunger 210 may have to be overcome. For example, a crew member may urge the seat bottom 105 upward, which forces the complementary smoothed or rounded portion of a seat bottom 105 against the protruding end of the plunger 210, forcing the spring plunger 210 to articulate or withdraw within its recess in the frame 108 to allow the seat bottom 105 to move to the stowed position. Optionally, the seat frame 108 may have a second complementary recess into which the spring plunger 210 extends when the seat is in the deployed position.

Figure 11B:
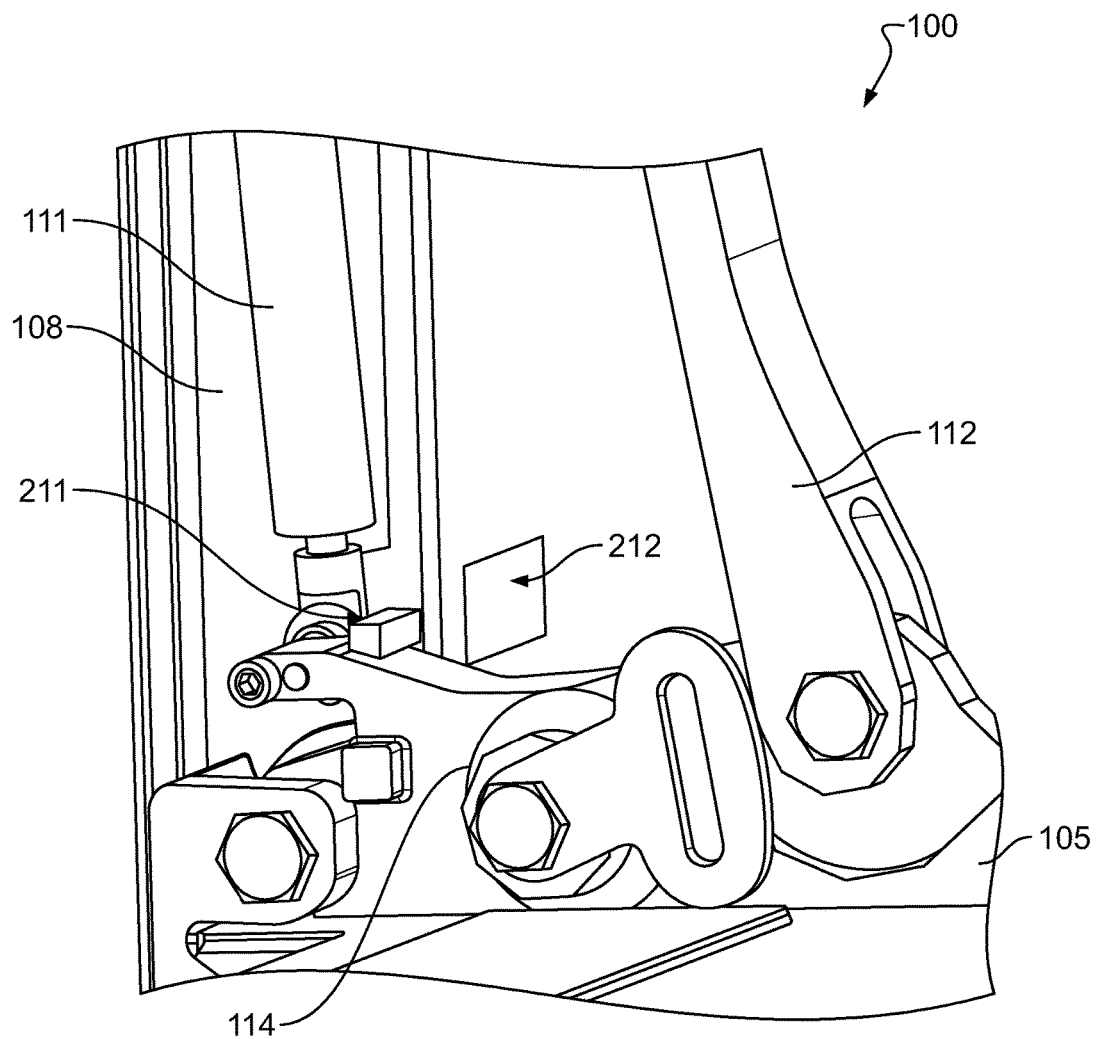

FIG. 11B illustrates another embodiment of a biasing mechanism for retaining the seat in a deployed position. A spring-biased button, lever, or slide mechanism 212 may be disposed within a surface of the seat frame 108 on one or both sides of the seat bottom 105 and may articulate a locking bolt 211 coupled to one end of the side mechanism that protrudes through a complementary hole in the frame 108 toward the hinge mechanisms 113/114 for the seat bottom 105 to lock the seat bottom 105 in the deployed position by preventing upward rotation of the hinge mechanism 113/114. The locking bolt 211 may be spring-loaded and tapered or chamfered such that the locking bolt 211 extends through the hole in the frame 108 as the seat bottom 105 is folded downward toward the deployed position to lock the seat bottom 105 in place. Prior to folding the seat bottom 105 upward into the stowed position, the locking bolt 211 may be retracted into the frame 108 by a user depressing or sliding the button, lever or slide mechanism 212 in an inward direction until the locking bolt 211 does not protrude through the hole in the seat frame 108.

Figure 4A:
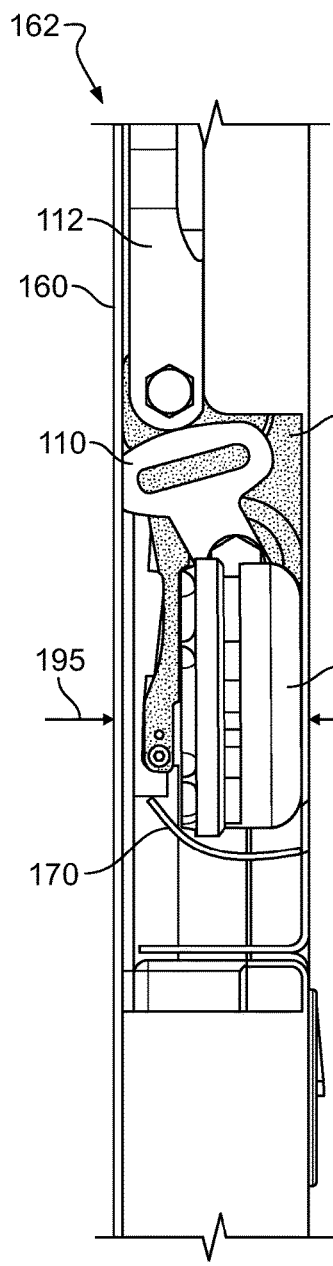
FIGS. 4A-4B illustrate side views of a storage area for a CAS.
Figure 4B:
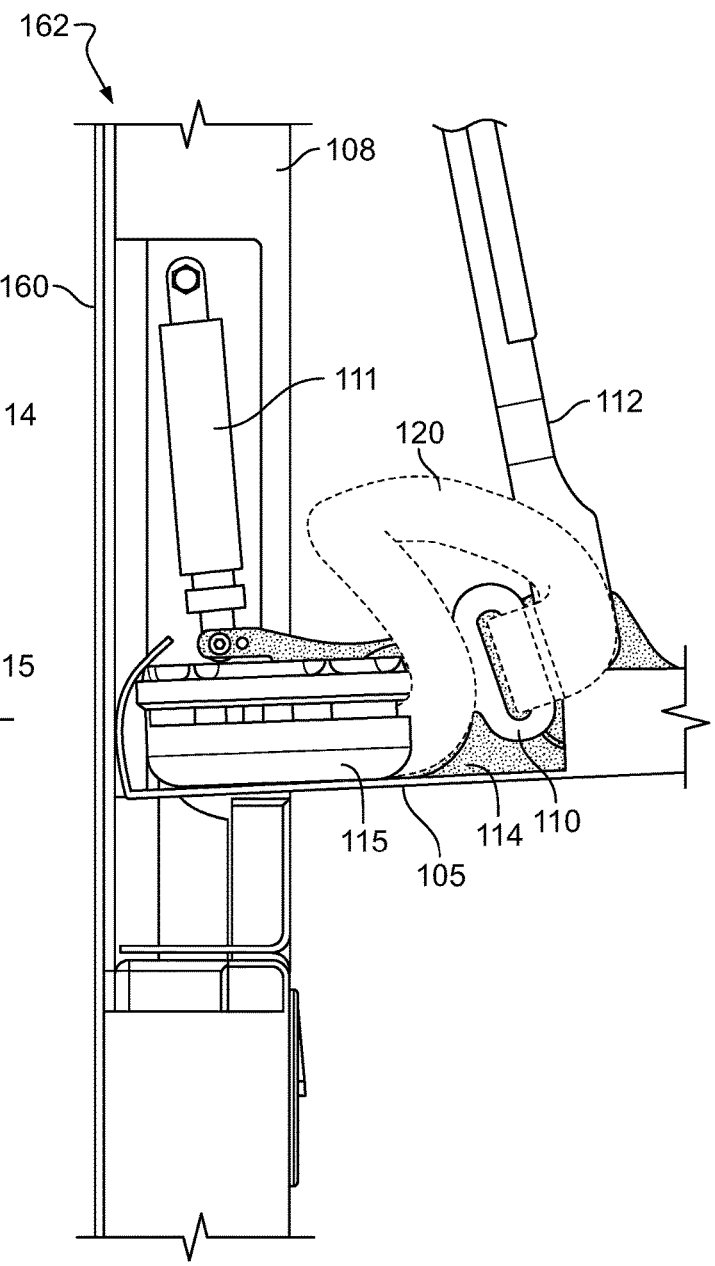

Turning to FIGS. 4A and 4B, an implementation of a storage area 162 for the CAS 100 is depicted. For example, FIG. 4A illustrates the storage area 162 when the CAS 100 is in the stowed position, and FIG. 4B illustrates the storage area when the CAS 100 is in the deployed position. In the example shown in FIGS. 4A-4B, seat bottom 105 extends almost entirely back to the opposite surface 160 from which the seat bottom 105 extends. In some implementations, a female buckle 115 may be received by an arcuate or curved backstop 170, which may be configured to contact or come close to contacting the wall 160 when the seat bottom 105 is in the deployed position. This prevents debris or other items, such as the straps or male buckle plates, from falling into the hinge assembly area beneath the extending members 158 (FIG. 1D), which could impede the travel of the seat bottom 105. In some examples, the backstop 170 may have a curved contour such that the contact or close-to-contact condition is maintained during a substantial portion of the travel of the seat bottom 105 between the stowed and deployed positions. A width 195 of the storage area 162 for the buckle and strap may be 30 mm to 90 mm, in other embodiments 40 mm to 80 mm, in further embodiments 40 to 70 mm, in yet additional embodiments 40 mm to 60 mm, and in preferred embodiments 40 to 50 mm, and in the most preferred embodiments 45 mm, 46 mm, 47 mm, 49 mm, or 50 mm. The female buckle 115 may be about 30 mm thick (or wide) and in other embodiments 25 mm to 35 mm side or 20 mm to 40 mm wide.

Figure 5A:
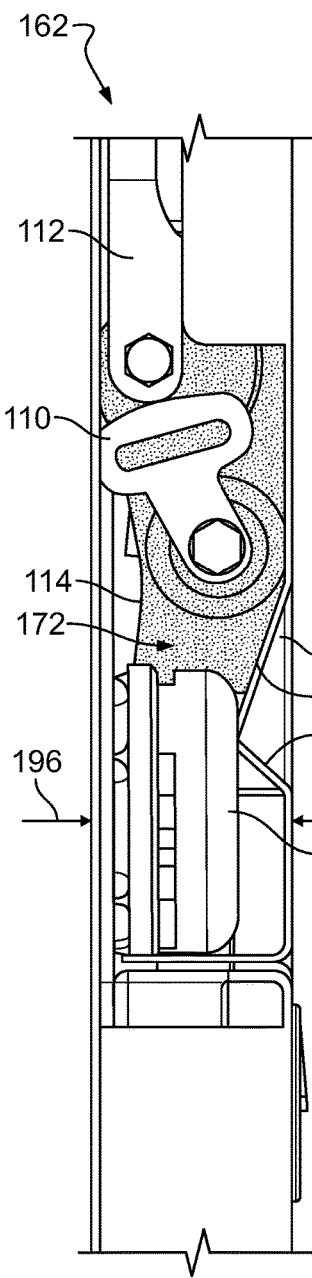
FIGS. 5A-5B illustrate side views of a storage area for a CAS
Figure 5B:
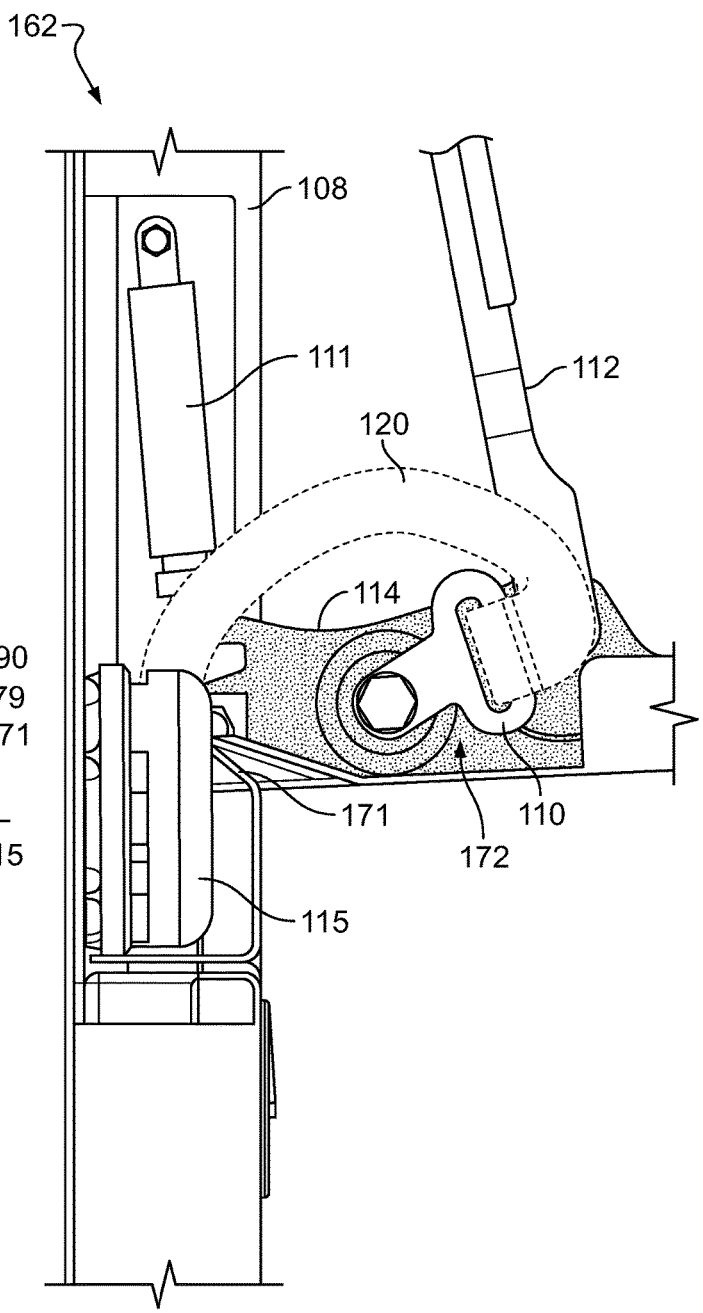

FIGS. 5A and 5B depict another implementation of the storage area 162 for the CAS 100. For example, FIG. 5A illustrates the storage area 162 when the CAS 100 is in the stowed position, and FIG. 5B illustrates the storage area when the CAS 100 is in the deployed position. In the example shown in FIGS. 5A-5B, the aisle-facing (e.g., outward-facing) wall of the CAS 100 may include inwardly extending wall portions 171 and 179. When the CAS 100 is in the stowed position, the inwardly extending wall portions 171 and 179 form a triangular-shaped indentation 190. In some implementations, the walls 171 and 179 may be configured such that when seat bottom 105 rotates downward into a deployed position as shown in FIG. 5B, the wall 179 does not interfere with wall 171 but still substantially seals and closes off the storage area 162 from the external environment so that debris and other objects do not enter the belt and strap storage compartment. In the depicted example, the storage area 162 (having width 196) may have a narrowed portion having a width approximately the same as a width of the female buckle 115.

In addition, the strap 120 may be received into an area 172 that may hold the strap 120 and/or buckle 115 relatively firmly in place such that the strap 120 and/or buckle 115 does not move substantially during flight, as when the aircraft experiences turbulence. The fabric straps 120 may be allowed to move or float relatively freely in area 172, which may be enclosed within the storage area 162 when the seat bottom 105 is in the stowed position. A width 196 of the storage area 162 for the buckle 115 and strap 120 may be 30 mm to 90 mm, in other embodiments 40 mm to 80 mm, in further embodiments 40 to 70 mm, in yet additional embodiments 40 mm to 60 mm, and in preferred embodiments 40 to 50 mm, and in the most preferred embodiments 45 mm, 46 mm, 47 mm, 49 mm, or 50 mm. The female buckle 115 may be about 30 mm thick (or wide) and in other embodiments 25 mm to 35 mm side or 20 mm to 40 mm wide.

Figures 6A, 6B:
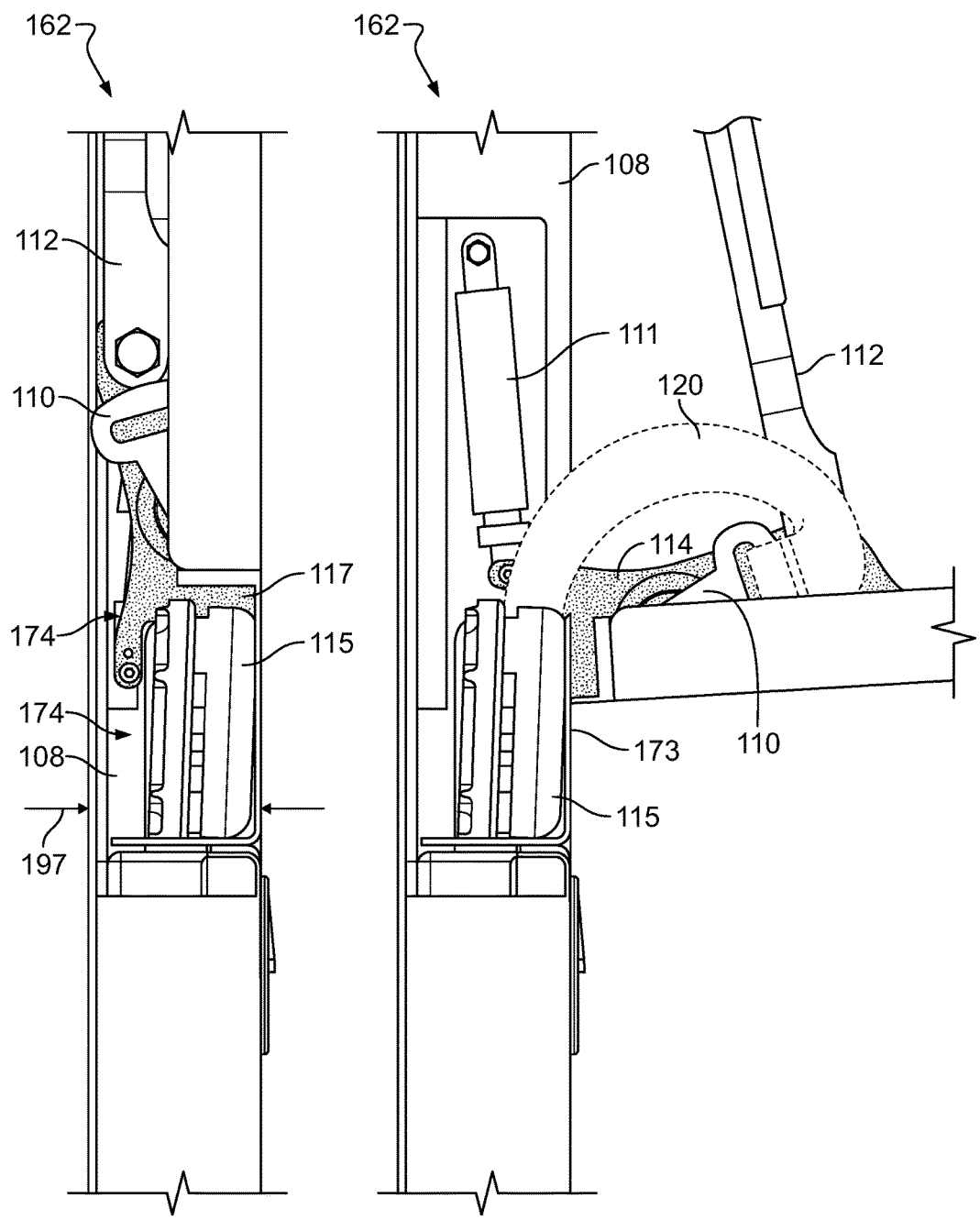
FIGS. 6A-6B illustrate side views of a storage area for a CAS.

FIGS. 6A and 6B depict another implementation of the storage area 162 for the CAS 100. For example, FIG. 6A illustrates the storage area 162 when the CAS 100 is in the stowed position, and FIG. 6B illustrates the storage area when the CAS 100 is in the deployed position. In the example shown in FIGS. 6A-6B, the aisle-facing (e.g., outward-facing) wall of the CAS 100 may include an retainer portion 173 that does not extend inwardly (e.g., toward the front of the aircraft). In some implementations, the female buckle 115 may be held by rear retaining elements (not shown) against the retainer portion 173, which creates a storage area 174 for the lap belt straps 120. A width 197 of the storage area 174 for the buckle 115 and strap 120 may be 30 mm to 90 mm, in other embodiments 40 mm to 80 mm, in further embodiments 40 to 70 mm, in yet additional embodiments 40 mm to 60 mm, and in preferred embodiments 40 to 50 mm, and in the most preferred embodiments 45 mm, 46 mm, 47 mm, 49 mm, or 50 mm. The female buckle 115 may be about 30 mm thick (or wide) and in other embodiments 25 mm to 35 mm side or 20 mm to 40 mm wide. Alternatively or additionally, the area indicated by reference number 117 may be enlarged to accommodate the lap belt straps 120. The retaining element 173 may positioned between the extension members 158 shown in FIG. 1D. In this example, the buckle 115 and strap 120 may automatically fall by the force of gravity into storage area 174 as the seat is raised to the stowed position.

Figures 7A, 7B:
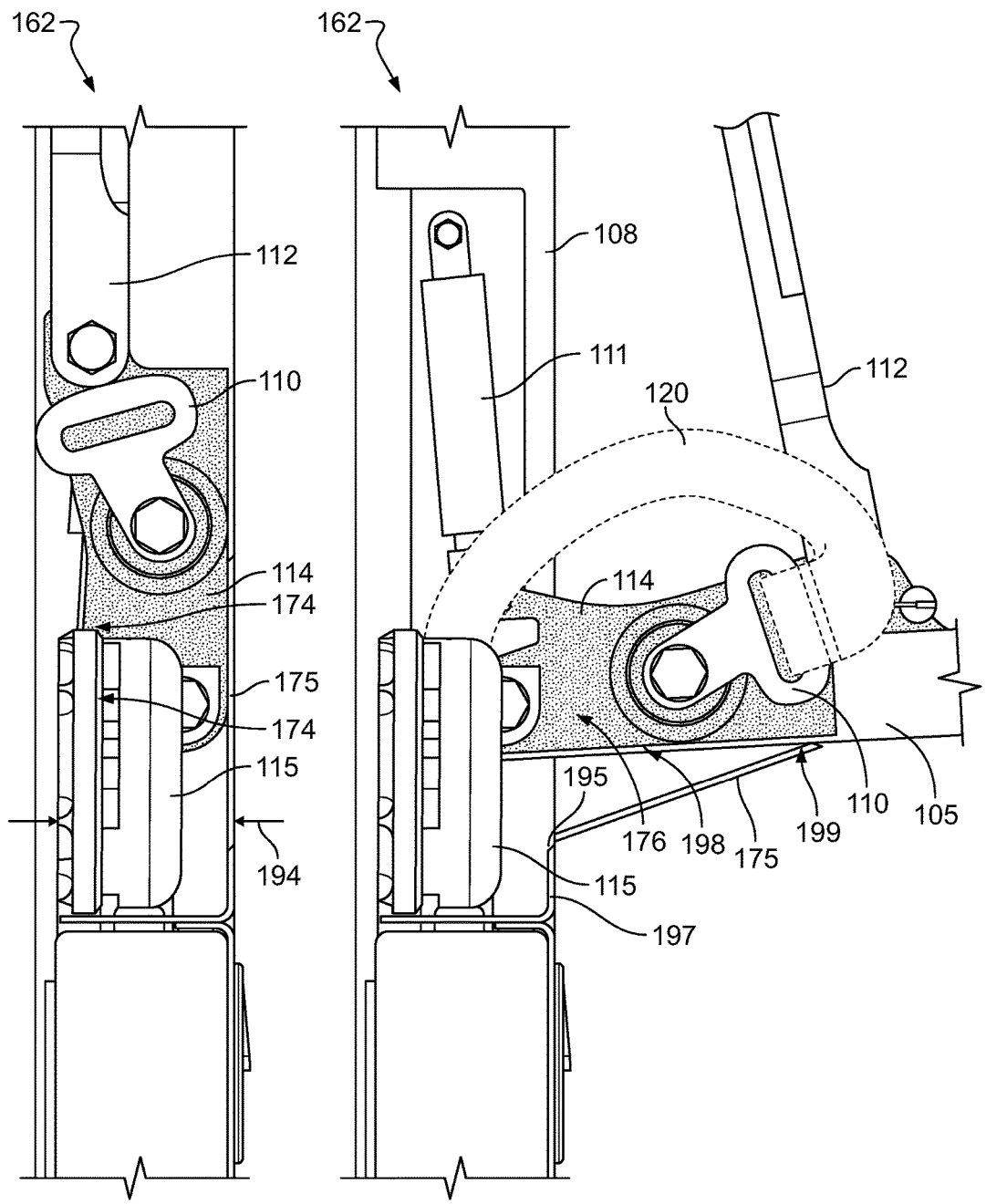
FIGS. 7A-7B illustrate side views of a storage area for a CAS.

FIGS. 7A and 7B depict another implementation of the storage area 162 for the CAS 100. For example, FIG. 7A illustrates the storage area 162 when the CAS 100 is in the stowed position, and FIG. 7B illustrates the storage area when the CAS 100 is in the deployed position. In the example shown in FIGS. 7A-7B, the aisle-facing (e.g., outward-facing) wall of the CAS 100 includes a hinged wall portion 175 which is spring biased into a vertical position via a torsion spring (not shown, but mounted proximate location 195). In some implementations, a lower end of wall 175 is hinged relative to fixed wall portion 197 at pivot point 195. A lower end of seat bottom 105 may have a chamfered end 198 which mates with a complementary chamfered top end 199 of wall 175 to seal off the storage area 162 when the seat bottom 105 is in the stowed position. The top end 199 of wall portion 175 may articulate to the right (as shown in FIGS. 7A-7B) as the seat bottom 105 is moved into the deployed position and slides against the seat bottom 105. In addition, the wall portion 175 may be positioned between extension members 158 shown in FIG. 1D. A width 194 of the storage area for the buckle and strap is 30 mm to 90 mm, in other embodiments 40 mm to 80 mm, in further embodiments 40 to 70 mm, in yet additional embodiments 40 mm to 60 mm, and in preferred embodiments 40 to 50 mm, and in the most preferred embodiments 45 mm, 46 mm, 47 mm, 49 mm, or 50 mm. The female buckle 115 may be about 30 mm thick (or wide) and in other embodiments 25 mm to 35 mm side or 20 mm to 40 mm wide. In this embodiment, the buckle 115 and strap 120 may automatically fall by the force of gravity into storage area 174 as the seat is raised to the stowed position.

FIGS. 8A and 8B depict another implementation of the storage area 162 for the CAS 100. For example, FIG. 8A illustrates the storage area 162 when the CAS 100 is in the stowed position, and FIG. 8B illustrates the storage area when the CAS 100 is in the deployed position. In the example shown in FIGS. 8A-8B, a fabric sheath 156 conceals the hinge area and prevents entry of debris or other objects. In some implementations, extension members 158 at lateral edges of seat bottom 105 may articulate into a receiving portion 157 of a hinge mount. This permits the hinge point for the CAS 100 to be located within the CAS structure while providing seat bottom 105 with a rear or lower extension member 158 which shields the hinge area and substantially prevents fingers or other objects from being pinched in the hinge mechanism. A width 178 of a storage area 177 for the buckle and strap may be 30 mm to 90 mm, in other embodiments 40 mm to 80 mm, in further embodiments 40 to 70 mm, in yet additional embodiments 40 mm to 60 mm, and in preferred embodiments 40 to 50 mm, and in the most preferred embodiments 45 mm, 46 mm, 47 mm, 49 mm, or 50 mm. The female buckle 115 may be about 30 mm thick (or wide) and in other embodiments 25 mm to 35 mm side or 20 mm to 40 mm wide.

In the embodiment of the storage area 162 illustrated in FIGS. 8A and 8B, a flexible sheath 156 articulates into the interior of the CAS 100 when deployed and, when in a stowed condition stretches flat to cover and visually conceal the internal mechanical components of the CAS hinge assembly. The flexible sheath 156, for example, may be formed from a flexible fabric such as an upholstery fabric. In other embodiments, the flexible sheath 156 may be formed of a synthetic flexible material such as plastic or rubber. In further embodiments, the flexible sheath 156 may be formed of leather. In this embodiment the female buckle 115 (not shown) may be held against the wall 160, as described above, or may be positioned elsewhere in storage area 177. One advantage of the latter design is that the relatively large storage area 177 may enable the lap straps and buckle parts to more naturally fall into the storage area 177 as the seat is raised into the stowed position. In this connection it should be noted that the extension members 158 may exist only at the lateral sides of seat bottom 105 and thus the storage area 177 can be accessed across an entire lateral width 178.

Figure 9A:
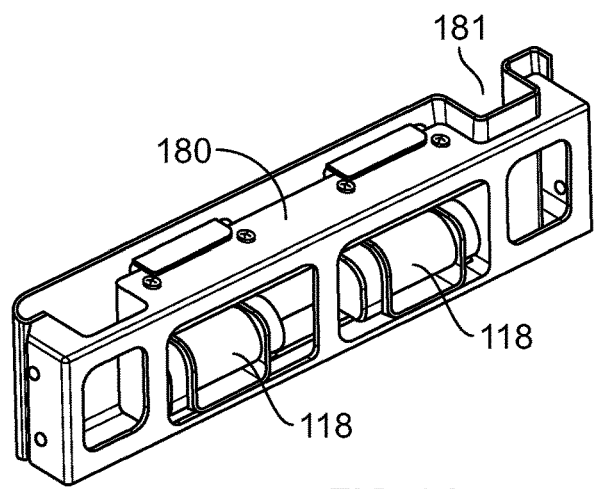
FIGS. 9A-9D illustrate an integrated, one-piece shoulder strap inertial reel and retractor assembly.
Figure 9B:
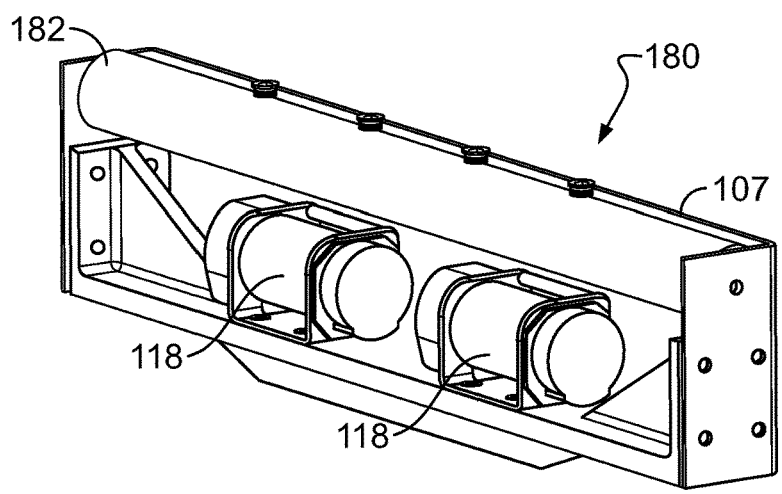
Figure 9C:
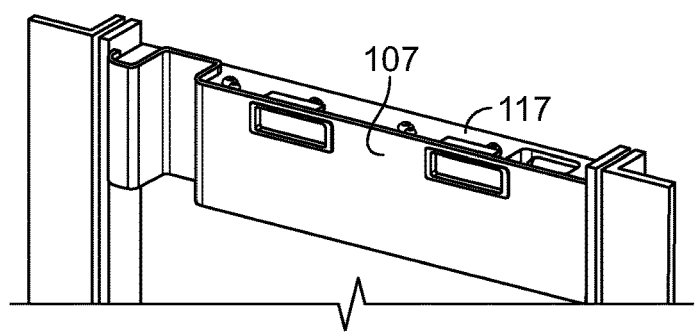
Figure 9D:
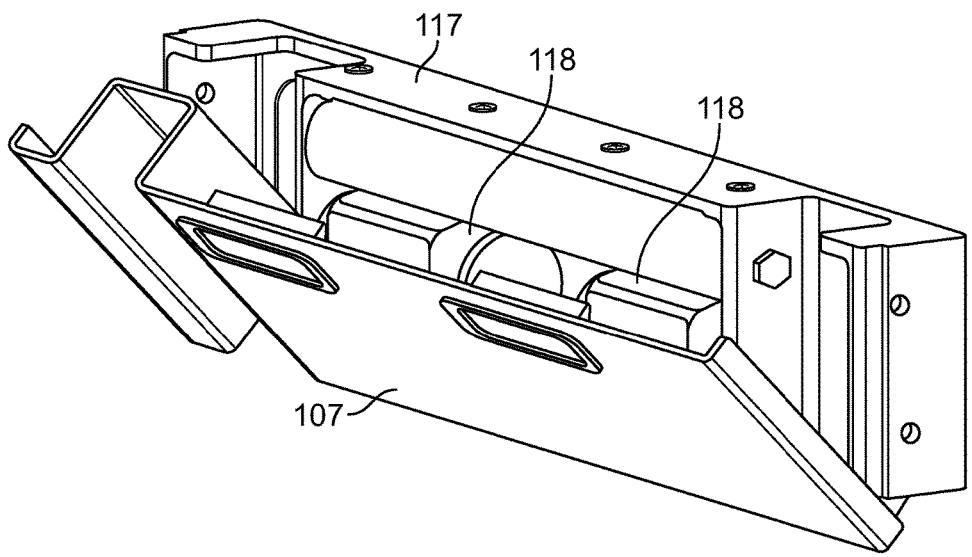

Turning to FIGS. 9A to 9D, an integrated, one-piece shoulder strap inertial reel and retractor assembly 180 is illustrated. For example, FIGS. 9A-9B illustrate rear perspective views of the assembly 180, FIG. 9C illustrates a front perspective view of the assembly 180, and FIG. 9D illustrates a front perspective view of the assembly 180 with a portion of the cover panel 107 removed. In some implementations, the assembly 180 may be accessed and replaced by maintenance personnel by removing cover panel 107 (shown in FIG. 1A). In some implementations, the shoulder straps 103 (FIG. 1A) for the CAS 100 may be wound around spools 118 as shown in the rear view of FIG. 9A. In some examples, the front panel 107 may form part of a recess 181 for the handset cord 116 (shown in FIG. 2A). The front view of FIG. 9B shows an alternative implementation of a guide roller 182 over which the shoulder straps 103 may pass during extension and/or retraction of the shoulder straps 103 from the spools 118 to prevent twisting or tangling of the shoulder straps 103. In this example, the roller 182 may extend across a width of the assembly 180. In some implementations, the cover panel 107 may be tool-lessly held into place such that the cover panel 107 can be removed by maintenance personnel wishing to gain access to the assembly 180. For example, tabs and spring elements (not shown) may be used to hold the cover panel 107 in place until removed by maintenance personnel. In some implementations, the entire inertial reel and retractor assembly 180 may be removed and replaced as a single unit, which may expedite maintenance operations.

Figures 10A, 10B:
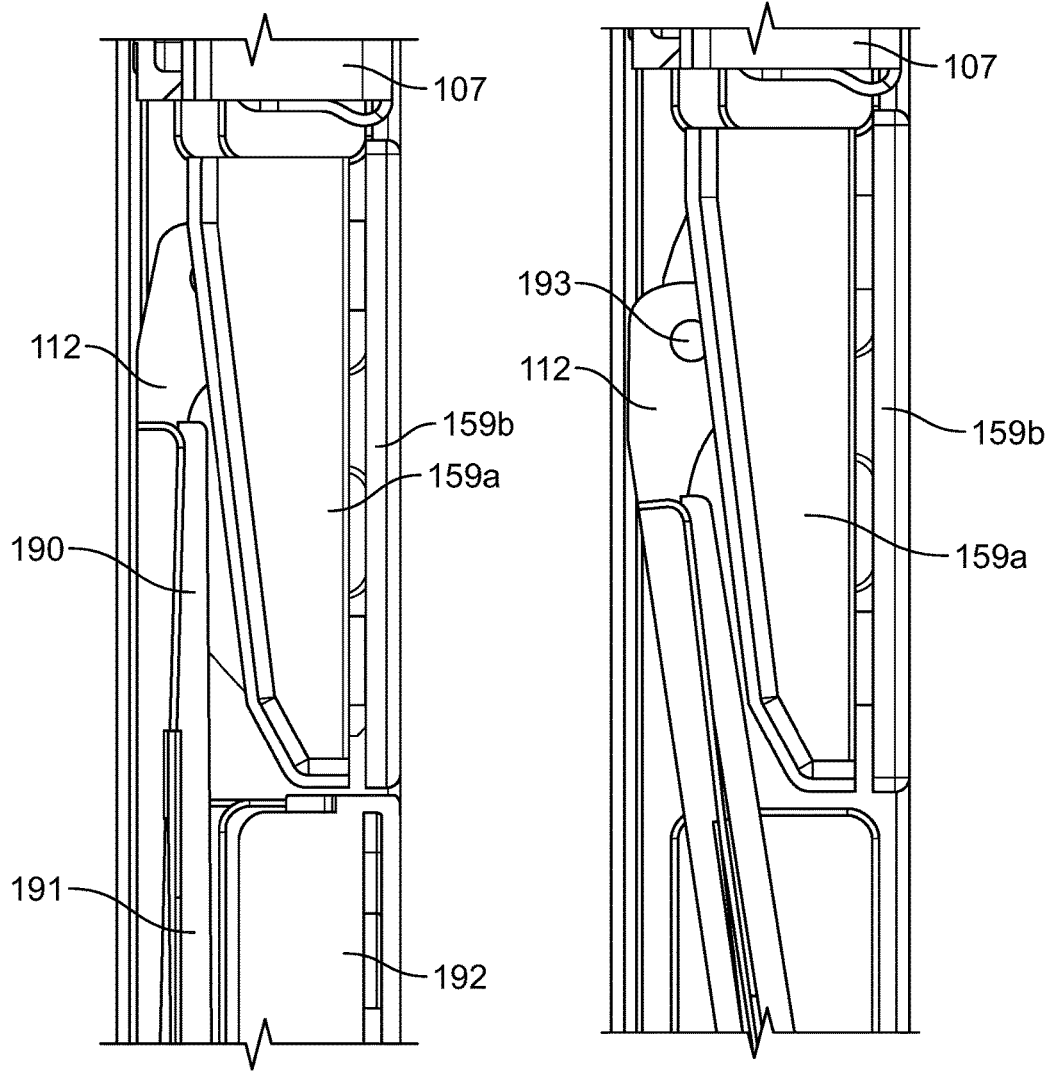
FIGS. 10A-10B illustrate side views of a portion of a CAS in a stowed position where a seat bottom cushion is positioned immediately below a shoulder cushion and supports.

FIGS. 10A and 10B illustrate a portion of the CAS 100 that show a solution which overcomes potential interference between a shoulder cushion and supports 159a and 159b and an upper seatback 190. FIG. 10A shows the seat bottom 105 of the CAS 100 in the stowed condition, in which seat bottom cushion 192 is positioned immediately below the shoulder cushion and supports 159a and 159b. As the seat bottom 105 articulates into the deployed or seated position as shown in FIG. 10B, a seatback frame 112 rotates downward and to the left (as shown in FIGS. 10A-10B), as guided by a slot (not shown) followed by a corresponding pin element 193. In some examples, the seatback frame 112 makes up a rear portion of the seatback assembly 106. In some implementations, the rotation of the seatback frame 112 causes a slight recline of a seatback assembly 106 (FIG. 2A) as the seat bottom 105 is moved from the stowed to the deployed position. The rotation of the seatback frame 112 to assists in creating clearance distance between an upper seatback cushion 190 and the shoulder cushion and supports 159a and 159b. The upper seatback cushion 190 may be thinner than a lower seatback cushion 191 such that the overall seatback cushion 190/191 is tapered. The tapered shape of the seatback cushion 190/191 may provide additional clearance between the shoulder cushion and support 159a and seatback assembly 106, which includes the seatback cushions 190/191 and seatback frame 112. This design enhances the amount of cushioning that may be provided and also permits the lower seatback cushion 191 to extend up behind the shoulder support and cushion 159a, providing a cleaner and more aesthetically pleasing appearance.

While the foregoing embodiments were described primarily in the context of an aft-facing crew attendant seat, the CAS 100 and components described herein may be applied in the context of a forward-facing CAS as well. In forward facing embodiments it may be possible to provide an even lower profile CAS due to the fact that less cushioning may be required for the head and shoulder cushions because the primary load during an impact may be borne by the lap and shoulder belts instead of the cushions. However, in such embodiments it may be advantageous to use wider, thicker or padded lap and shoulder belts to help diffuse the force of impact. In those embodiments, larger storage areas 162 may be required.

In still other embodiments the CAS 100 may face laterally (e.g., in a direction parallel to arrow 151 shown in FIG. 1A or perpendicular to the longitudinal axis of the plane). In such embodiments, the shoulder strap reels may be advantageously mounted at angles (relative to the horizontal plane) to help bear the forward load of the crew member during a crash or impact event.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A crew attendant seat assembly disposed within a wall of an aircraft cabin, the crew attendant seat assembly comprising:
   a frame defining a periphery of the crew attendant seat assembly within the wall;
   a seat portion positioned within the frame, the seat portion including a seat bottom hingedly connected to a seatback by a hinge mechanism, wherein the seat bottom is configured to hingedly rotate between a stowed position and a deployed position;
   a spring member mounted at a first end to an inner surface of the frame and at a second end to an adjustable aperture on the hinge mechanism, wherein the spring member has two mounting positions such that when in a deployed position,
      in a first mounting position, the seat bottom is biased upward toward the stowed position, and
      in a second mounting position, the seat bottom is configured to be maintained in the deployed position until urged upward toward the stowed position;
   a harness mounted to the seat portion for restraining a seated passenger, the harness including at least one shoulder strap and a lap belt configured to be coupled together by a buckle disposed at one end of the lap belt; and
   a storage area to retain at least one of the lap belt and the buckle within the frame when seat bottom is in the stowed position, wherein the at least one of the lap belt and the buckle are enclosed by the crew attendant seat assembly when the seat is in the stowed position.

2. The crew attendant seat assembly of claim 1, wherein:
   in the stowed position, an upper surface of the seat bottom abuts an outer surface of the seatback and a lower surface of the seat bottom is substantially flush with the frame; and
   in the deployed position, the upper surface of the seat bottom is substantially perpendicular to the outer surface of the seatback.

3. The crew attendant seat assembly of claim 1, wherein the hinge mechanism includes a coupling element configured to couple the seat bottom and the seatback to the hinge element such that the seat bottom and the seatback cooperatively hinge between the stowed position and the deployed position.

4. The crew attendant seat assembly of claim 3, wherein the coupling element of the hinge mechanism is configured to cause the seatback to cooperatively hinge to a partially reclined position as the seat bottom is moved from the stowed position to the deployed position.

5. The crew attendant seat assembly of claim 1, wherein the adjustable aperture is one of a plurality of adjustable apertures disposed on the hinge mechanism, wherein each of the plurality of adjustable apertures is associated with a predetermined amount of biasing force applied by the spring member on the hinge mechanism.

6. The crew attendant seat assembly of claim 1, wherein the spring member, when in the second mounting position, is configured to cause the seat bottom to automatically return to the deployed position until a predetermined amount of force is applied to move the seat bottom from the deployed position to the stowed position.

7. The crew attendant seat assembly of claim 1, wherein the spring member is configured to apply an amount of damping force to the seat bottom such that movement of the seat bottom from the deployed position to the stowed position is delayed by a predetermined amount to allow sufficient time for at least one of the lap belt and the buckle to fall into the storage area as the seat bottom moves to the stowed position.

8. The crew attendant seat assembly of claim 1, further comprising a spring plunger mounted to a surface of the frame, the spring plunger configured to protrude from the frame to lock the hinge mechanism coupled to the seat bottom in the deployed position.

9. The crew attendant seat assembly of claim 8, wherein an upward force applied to the seat bottom causes the spring plunger to withdraw into a recess in the frame to allow the seat bottom to move from the deployed position to the stowed position.

10. The crew attendant seat assembly of claim 1, further comprising a locking bolt mounted to one end of a spring-biased slide mechanism disposed within a surface of the frame, wherein the locking bolt is configured to protrude from a hole in the frame to lock the seat bottom in the deployed position.

11. The crew attendant seat assembly of claim 10, wherein an application of an inward sliding force to the slide mechanism and the locking bolt is configured to cause the slide mechanism and the locking bolt to withdraw into the frame to allow the seat bottom to move from the deployed position to the stowed position.

12. The crew attendant seat assembly of claim 1, wherein the seat bottom includes a handle recess disposed on a front edge of the seat bottom sized to receive one or more fingers of a user to allow the user to move the seat bottom between the stowed position and the deployed position.

13. The crew attendant seat assembly of claim 1, further comprising an access door hingedly mounted to a lower end of the frame, the access door covering a storage enclosure disposed below the seat bottom such that the access door is substantially flush with the frame when in a closed position.

14. The crew attendant seat assembly of claim 1, wherein the access door is configured to hingedly rotate in an outward and downward direction when moving from the closed position to an open position.

15. The crew attendant seat assembly of claim 1, further comprising a headrest portion positioned above the seatback, the headrest portion including a cushion configured to removably cover a storage enclosure disposed behind the headrest portion.

16. The crew attendant seat assembly of claim 1, wherein the seat bottom includes extension members extending from lateral edges of the seat bottom, wherein the extension members are configured to cover a respective hinge mechanism to prevent injury or introduction of physical obstructions to the respective hinge mechanism.

17. The crew attendant seat assembly of claim 1, further comprising an inertial reel and retractor assembly configured to removably attach the at least one shoulder strap to the crew attendant seat assembly above the seatback portion, the inertial reel and retractor assembly including spools around which at least a portion of a respective shoulder strap is wound.

18. The crew attendant seat assembly of claim 17, wherein the inertial reel and retractor assembly includes a guide roller extending across a width of the inertial reel and retractor assembly, wherein the at least one shoulder strap is configured to pass over the guide roller during extension and retraction of the at least one shoulder strap from the spools to prevent twisting or tangling of the at least one shoulder strap.

19. The crew attendant seat assembly of claim 1, wherein the frame for the crew attendant seat assembly is disposed within a vertical partition of the aircraft cabin.

20. The crew attendant seat assembly of claim 1, wherein the spring member includes a gas spring.

* * * * *